US011259178B2

(12) United States Patent
Hu

(10) Patent No.: US 11,259,178 B2
(45) Date of Patent: Feb. 22, 2022

(54) BLUETOOTH MESH NETWORK PROVISIONING AUTHENTICATION

(71) Applicant: Alibaba Group Holding Limited, George Town (KY)

(72) Inventor: Junfeng Hu, Hangzhou (CN)

(73) Assignee: Alibaba Group Holding Limited

( * ) Notice: Subject to any disclaimer, the term of this patent is extended or adjusted under 35 U.S.C. 154(b) by 156 days.

(21) Appl. No.: 16/411,902

(22) Filed: May 14, 2019

(65) Prior Publication Data
US 2019/0357043 A1    Nov. 21, 2019

(30) Foreign Application Priority Data

May 18, 2018 (CN) .......................... 201810480458.X

(51) Int. Cl.
*H04W 12/06* (2021.01)
*H04W 4/80* (2018.01)
(Continued)

(52) U.S. Cl.
CPC ........... *H04W 12/06* (2013.01); *H04L 9/0643* (2013.01); *H04L 9/0869* (2013.01); *H04W 4/80* (2018.02); *H04W 80/02* (2013.01); *H04W 84/18* (2013.01)

(58) Field of Classification Search
CPC ....... H04W 12/06; H04W 4/80; H04W 80/02; H04L 9/0643; H04L 9/0869
(Continued)

(56) References Cited

U.S. PATENT DOCUMENTS 8,035,479 B2    10/2011 Tran
8,514,758 B2    8/2013 De Kimpe
(Continued)

FOREIGN PATENT DOCUMENTS

CN    107509160    12/2017
TW    270307    1/2007
(Continued)

OTHER PUBLICATIONS

Murillo et al., Bluetooth Now or Low Energy: Should BLE Mesh Become a Flooding or Connection Oriented Network? IEEE, Feb. 15, 2018.

*Primary Examiner* — Jacob Lipman
(74) *Attorney, Agent, or Firm* — Van Pelt, Yi & James LLP

(57) ABSTRACT

A first set of device authentication parameters for a to-be-authenticated Bluetooth device in a Bluetooth mesh network is determined based at least in part on device identification information associated with the to-be-authenticated Bluetooth device. First authentication information is generated based at least in part on the first set of device authentication parameters and a first random number. The first authentication information and the first random number are forwarded to the to-be-authenticated Bluetooth device. Second authentication information and a second random number associated with the to-be-authenticated Bluetooth device are received, wherein the second authentication information is generated based at least in part on a second set of device authentication parameters and the second random number. The to-be-authenticated Bluetooth device is authenticated based at least in part on the second authentication information and the second random number.

18 Claims, 8 Drawing Sheets

(51) Int. Cl.
*H04L 9/06* (2006.01)
*H04W 80/02* (2009.01)
*H04L 9/08* (2006.01)
*H04W 84/18* (2009.01)

(58) Field of Classification Search
USPC .................................................. 726/4
See application file for complete search history.

(56) References Cited

U.S. PATENT DOCUMENTS

| | | |
|---|---|---|
| 8,670,374 B2 | 3/2014 | Bata |
| 9,025,461 B2 | 5/2015 | Krishnamurthy |
| 9,276,818 B2 | 3/2016 | Turon |
| 10,111,071 B2 | 10/2018 | Polo |
| 2005/0271021 A1 | 12/2005 | Alemany |
| 2006/0093998 A1 | 5/2006 | Vertegaal |
| 2006/0171540 A1 | 8/2006 | Lee |
| 2012/0300812 A1 | 11/2012 | Ly-Gagnon |
| 2013/0145000 A1 | 6/2013 | Meyer |
| 2015/0245204 A1* | 8/2015 | Heydon ............... H04L 45/02 713/171 |
| 2015/0245351 A1 | 8/2015 | Banerjea |
| 2016/0241999 A1 | 8/2016 | Chin |
| 2016/0286474 A1 | 9/2016 | Panwar |
| 2017/0019752 A1 | 1/2017 | Hardt |
| 2017/0092034 A1* | 3/2017 | Want ............... G06Q 20/0457 |
| 2017/0150362 A1 | 5/2017 | Clemenson |
| 2017/0171754 A1* | 6/2017 | South ............... H04W 4/90 |
| 2017/0201854 A1 | 7/2017 | Choi |
| 2017/0272317 A1 | 9/2017 | Singla |
| 2018/0089410 A1* | 3/2018 | Caso ............... H04W 4/08 |
| 2018/0132102 A1 | 5/2018 | Kwon |
| 2018/0176851 A1 | 6/2018 | Lim |
| 2019/0037470 A1 | 1/2019 | Yeh |
| 2019/0394209 A1* | 12/2019 | Urabe ............... H04W 12/08 |

FOREIGN PATENT DOCUMENTS

| | | |
|---|---|---|
| TW | 615047 | 2/2018 |
| WO | 2017051173 | 3/2017 |

* cited by examiner

BLUETOOTH MESH NETWORK PROVISIONING AUTHENTICATION

CROSS REFERENCE TO OTHER APPLICATIONS

This application claims priority to People's Republic of China Patent Application No. 201810480458.X entitled BLUETOOTH MESH NETWORK AND PROVISIONING AUTHENTICATION METHOD, DEVICE AND STORAGE MEDIUM THEREOF filed May 18, 2018 which is incorporated herein by reference for all purposes.

FIELD OF THE INVENTION

The present application relates to the field of Bluetooth wireless technology. In particular, it relates to Bluetooth wireless networks.

BACKGROUND OF THE INVENTION

Bluetooth is a wireless technology standard used for transmitting and receiving data over relatively short distances. Example uses of Bluetooth wireless technology include communication between a mobile device (e.g., phone) and a handsfree headset, communication between a mobile device (e.g., phone) and a car stereo system, wireless networking when relatively little bandwidth is needed, communication between a computer and input and output devices (e.g., mouse, keyboard, printer, etc.), communication between a game console and a game controller, and other short-range communication among a plurality of devices. Bluetooth wireless technology typically uses short-wavelength radio waves (e.g., in the 2.4 gigahertz to 2.485 gigahertz range). Because radio waves are used, devices using Bluetooth wireless technology do not have to be in visual line of sight of one another in order to communicate. Devices in Bluetooth wireless networks typically need to be authenticated. Authentication can consume network resources. Thus, authentication methods that are efficient and not resource-intensive would be useful.

BRIEF DESCRIPTION OF THE DRAWINGS

Various embodiments of the invention are disclosed in the following detailed description and the accompanying drawings.

DETAILED DESCRIPTION

Figure 1:
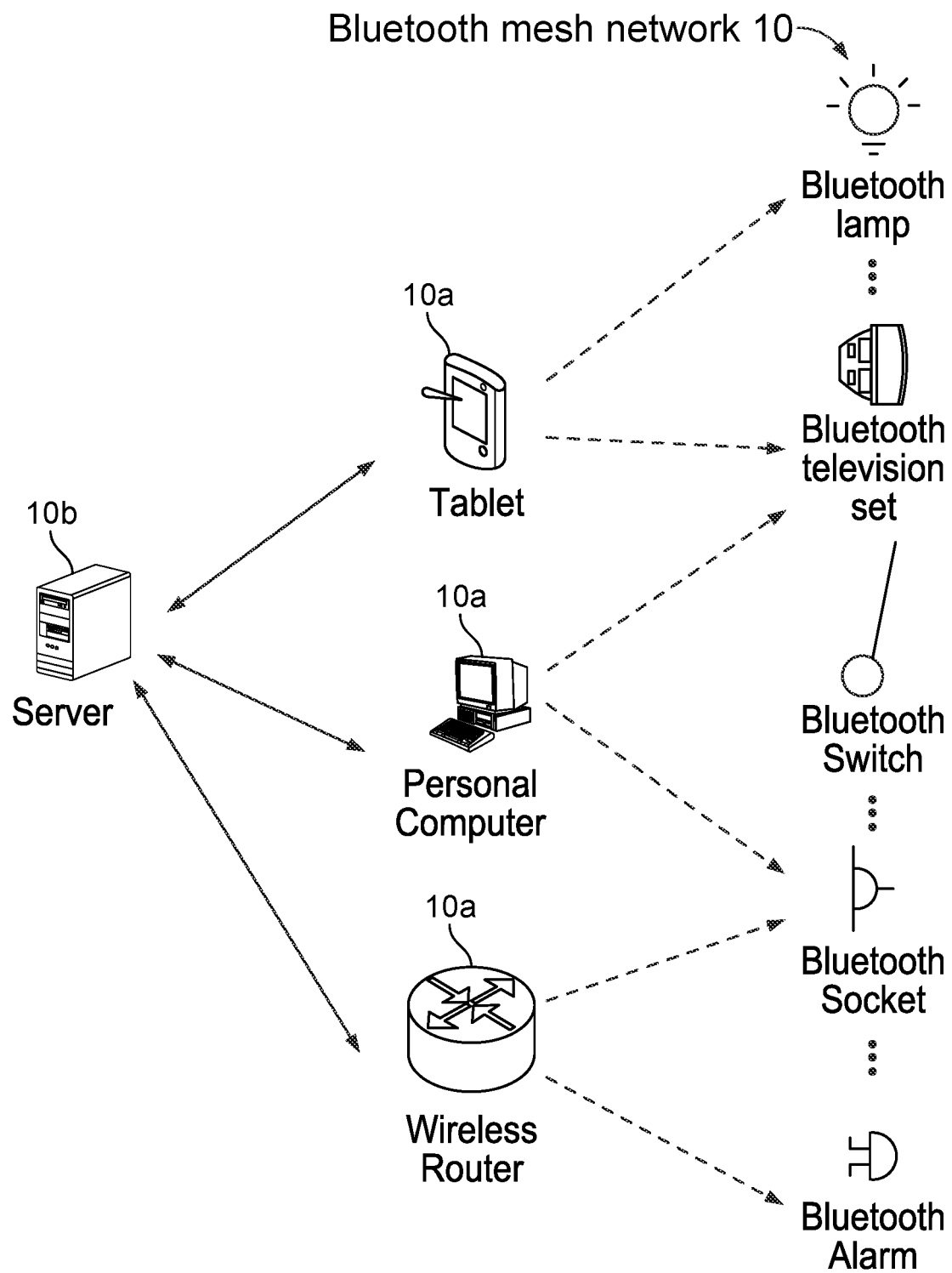
FIG. 1 is a diagram illustrating an embodiment of a Bluetooth mesh network in accordance with the invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A mesh network (e.g., a Bluetooth mesh network) is a type of wireless network in which each node may send and receive signals. Each node may communicate directly with one or more peer nodes. To overcome limits on the communication range of Bluetooth devices, the Bluetooth Special Interest Group published the Bluetooth Mesh Profile Specification, which specifies the Bluetooth Low Energy (BLE) standard. Bluetooth mesh networks include provisioners and Bluetooth devices. To ensure security of a Bluetooth mesh network, Bluetooth devices need to be added to the Bluetooth mesh network by being provisioned by a provisioner. During the provisioning process, the provisioner often uses selected out-of-band (OOB) information to authenticate Bluetooth devices to ensure secure network connections. In various embodiments, OOB information is information that is not transmitted using the same channel as information transmitted by nodes in a Bluetooth mesh network during normal operation of the Bluetooth mesh network. Use of a different channel for authentication than for normal Bluetooth mesh network node communication reduces the risk of eavesdropping and promotes network security. Existing authentication methods are relatively demanding on the processing capacities of provisioners and may limit Bluetooth mesh network deployment. The present application discloses a Bluetooth mesh network architecture and provisioning authentication method that addresses Bluetooth mesh network limitations by allowing for globalized provisioning authentication, reduced processing demand on Bluetooth gateways, and simplified deployment of Bluetooth mesh networks. An advantage of the disclosed Bluetooth mesh network architecture and provisioning authentication method is freeing gateway devices from the provisioning authentication process, which allows network resources to be utilized more efficiently.

Technical problems associated with existing OOB authentication methods place relatively high demands on provisioner processing capacity, which may limit Bluetooth mesh network deployments. In various embodiments, there is interaction between a Bluetooth gateway and a server in order to perform Bluetooth mesh network provisioning. In various embodiments, Bluetooth gateways detect Bluetooth devices that request access to a Bluetooth mesh network and transmit information between a server and Bluetooth devices. In various embodiments, the server performs authentication for Bluetooth devices via Bluetooth gateways that have detected the Bluetooth devices. This has the following practical and technological benefits: it globalizes provisioning authentication, frees gateway devices from the provisioning authentication process, reduces requirements placed on Bluetooth gateways, simplifies deployment of Bluetooth mesh networks, and helps to promote the development of Bluetooth mesh technology.

In some embodiments, a Bluetooth mesh network includes Bluetooth gateways and a server. In various embodiments, the Bluetooth gateways detect Bluetooth devices that request access to the Bluetooth mesh network and transmit information between the server and the Bluetooth devices. In various embodiments, the server conducts authentication in conjunction with Bluetooth devices via Bluetooth gateways that have detected Bluetooth devices. This provides a foundation for secure access to the Bluetooth mesh network by Bluetooth devices. The fact that the server can conduct authentication in conjunction with each Bluetooth device that requests access to the Bluetooth mesh network accomplishes the following: it globalizes provisioning authentication, frees gateway devices from the provisioning authentication process, reduces requirements placed on Bluetooth gateways, simplifies deployment of Bluetooth mesh networks, and helps to promote the development of Bluetooth mesh technology.

In some embodiments, a Bluetooth mesh network in accordance with the present invention includes one or more Bluetooth gateways and a server communicatively connected to the one or more Bluetooth gateways. The one or more Bluetooth gateways can be used to detect to-be-authenticated Bluetooth devices that request access to the Bluetooth mesh network and transmit information between the to-be-authenticated Bluetooth devices and the server. The server can conduct authentication in conjunction with the to-be-authenticated Bluetooth devices via destination Bluetooth gateways that detect the to-be-authenticated Bluetooth devices so that the to-be-authenticated Bluetooth devices can securely access the Bluetooth mesh network.

In some embodiments, Bluetooth mesh network provisioning authentication from the perspective of a server includes using a to-be-authenticated Bluetooth device's device identification information reported by a destination Bluetooth gateway as a basis to determine authentication parameters of the to-be-authenticated Bluetooth device (wherein the destination Bluetooth gateway is the Bluetooth gateway that detected the to-be-authenticated Bluetooth device in the Bluetooth mesh network), using the authentication parameters of the to-be-authenticated Bluetooth device (maintained by the server) and a server random number to generate first authentication information, forwarding the first authentication information and the server random number via the destination Bluetooth gateway to the to-be-authenticated Bluetooth device so that the to-be-authenticated Bluetooth device can subject the server to authentication, and, upon receiving second authentication information and a device random number forwarded by the destination Bluetooth gateway, using the second authentication information and the device random number to subject the to-be-authenticated Bluetooth device to authentication, wherein the second authentication information is generated by the to-be-authenticated Bluetooth device on the basis of its built-in authentication parameters and the device random number.

As used herein, to "subject the server to authentication" corresponds to authenticating the server (e.g., confirming the server should be trusted). For example, a to-be-authenticated Bluetooth device may authenticate the server by confirming that information sent from the server to the to-be-authenticated Bluetooth device matches (e.g., is identical to) corresponding information maintained by the to-be-authenticated Bluetooth device (thus, using the information sent from the server to subject the server to authentication). Similarly, as used herein, to "subject the to-be-authenticated Bluetooth device to authentication" corresponds to authenticating the to-be-authenticated Bluetooth device (e.g., confirming the to-be-authenticated Bluetooth device should be trusted). For example, the server may authenticate the to-be-authenticated Bluetooth device by confirming that information sent from the to-be-authenticated Bluetooth device to the server matches corresponding information maintained by the server (thus, using the information sent from the to-be-authenticated Bluetooth device to subject the to-be-authenticated Bluetooth device to authentication).

In some embodiments, Bluetooth mesh network provisioning authentication from the perspective of a to-be-authenticated Bluetooth device includes broadcasting device identification information of the to-be-authenticated Bluetooth device so that a destination Bluetooth gateway can forward the device identification information to the server in the Bluetooth mesh network (wherein the destination Bluetooth gateway is the Bluetooth gateway that detected the to-be-authenticated Bluetooth device in the Bluetooth mesh network), receiving first authentication information and a server random number (forwarded by the destination Bluetooth gateway) and using the first authentication information and the server random number as a basis to subject the server to authentication (the first authentication information having been generated by the server on the basis of authentication parameters of the to-be-authenticated Bluetooth device, which are maintained by the server), and generating second authentication information based on authentication parameters built into the to-be-authenticated Bluetooth device and a device random number and forwarding the second authentication information and the device random number via the destination Bluetooth gateway to the server so that the server can subject the to-be-authenticated Bluetooth device to authentication.

In some embodiments, a server in accordance with the present invention includes memory, a processor, and a communication component. In some embodiments, the communication component receives a to-be-authenticated Bluetooth device's device identification information reported by a destination Bluetooth gateway (wherein the destination Bluetooth gateway is the Bluetooth gateway that detected the to-be-authenticated Bluetooth device in a Bluetooth mesh network). In some embodiments, the memory stores computer programs and authentication parameters of registered Bluetooth devices including the to-be-authenticated Bluetooth devices. In some embodiments, the processor executes the computer programs, e.g., for using the device identification information of the to-be-authenticated Bluetooth device as a basis to determine authentication parameters of the to-be-authenticated Bluetooth device, using the authentication parameters of the to-be-authenticated Bluetooth device (maintained by the server) and a server random number to generate first authentication information, forwarding the first authentication information and the server random number via the destination Bluetooth gateway to the to-be-authenticated Bluetooth device so that the to-be-authenticated Bluetooth device can subject the server to authentication, and, upon receiving second authentication information and a device random number forwarded by the destination Bluetooth gateway by the communication component, using the second authentication information and the device random number to subject the to-be-authenticated Bluetooth device to authentication (wherein the second authentication information is generated by the to-be-authenticated Bluetooth device on the basis of its built-in authentication parameters and the device random number). In some embodiments, a computer-readable medium stores the computer programs that implement the provisioning authentication steps performed by the server.

In some embodiments, a to-be-authenticated Bluetooth device in a Bluetooth mesh network in accordance with the present invention includes memory, a processor, and a communication component. In some embodiments, the communication component broadcasts device identification information of the to-be-authenticated Bluetooth device so that a destination Bluetooth gateway can forward the device identification information to a server in the Bluetooth mesh network and receives first authentication information and a server random number (which are forwarded by the destination Bluetooth gateway), wherein the first authentication information is generated by the server on the basis of authentication parameters of the to-be-authenticated Bluetooth device maintained by the server and the destination Bluetooth gateway is the Bluetooth gateway that detected the to-be-authenticated Bluetooth device in the Bluetooth mesh network. In some embodiments, the memory stores computer programs and the authentication parameters of the Bluetooth device. In some embodiments, the processor executes the computer programs, e.g., for subjecting the server to authentication based on the first authentication information and the server random number, generating second authentication information based on authentication parameters in the memory and a device random number, and forwarding the second authentication information and the device random number via the destination Bluetooth gateway to the server so that the server can subject the to-be-authenticated Bluetooth device to authentication. In some embodiments, a computer-readable medium stores the computer programs that implement the steps performed by the to-be-authenticated Bluetooth device.

In various embodiments, Bluetooth gateways detect Bluetooth devices that request access to a Bluetooth mesh network and transmit information between a server and Bluetooth devices. As a result, the server may conduct authentication with Bluetooth devices via Bluetooth gateways that have detected Bluetooth devices. This provides a basis for secure access to the Bluetooth mesh network by Bluetooth devices. The fact that the server uniformly conducts authentication with each Bluetooth device that requests access to the Bluetooth mesh network accomplishes the following: it globalizes provisioning authentication, frees gateway devices from the provisioning authentication process, reduces requirements placed on Bluetooth gateways, simplifies deployment of Bluetooth mesh networks, and helps to promote the development of Bluetooth mesh technology.

Furthermore, the server may combine Bluetooth device authentication parameters maintained at the server end and authentication parameters built into Bluetooth devices to employ a static OOB authentication approach to conducting two-way authentication with Bluetooth devices, meaning that there would be no time during the static OOB authentication process when a user must intervene. The automation of provisioning authentication achieved in this way helps to improve user experience and increases provisioning authentication efficiency. In addition, the fact that different Bluetooth devices can be associated with different pieces of static OOB information helps to ensure the security of the provisioning authentication process.

In order to further clarify the objectives, technical schemes, and advantages of the present invention, further details of the present invention are described below in light of specific embodiments and corresponding drawings of the present invention. The embodiments described are only some of the embodiments of the present invention and are not all the embodiments. The technical schemes associated with various embodiments are explained in detail below in conjunction with the drawings.

FIG. 1 is a diagram illustrating an embodiment of a Bluetooth mesh network in accordance with the invention. As shown in FIG. 1, Bluetooth mesh network 10 includes one or more Bluetooth gateways 10a and a server 10b. The one or more Bluetooth gateways 10a and the server 10b are communicatively connected. The communicative connections may be wired or wireless. In some embodiments, one or more of Bluetooth gateways 10a and/or server 10b are implemented by the programmed computer system of FIG. 8. One or more Bluetooth devices in Bluetooth mesh network 10 may also be implemented by the programmed computer system of FIG. 8. In some embodiments, server 10b is implemented by the server shown in FIG. 6b. In some embodiments, one or more Bluetooth devices in Bluetooth mesh network 10 are implemented by the Bluetooth device shown in FIG. 7b.

In some embodiments, server 10b is deployed on a cloud and Bluetooth gateways 10a access the Internet (e.g., wide-area network or metropolitan-area network) via WiFi, Ethernet, fiber optics, or a 2G/3G/4G/5G or other mobile network. In some embodiments, Bluetooth gateways 10a establish communicative connections with server 10b via the Internet to achieve two-way communications with server 10b.

As shown in FIG. 1, the one or more Bluetooth gateways 10a may be computer devices that support Bluetooth technology, have Bluetooth detection functions, and have processing capability. Example devices include a wireless router, a smart phone, a tablet, a personal computer, a Bluetooth probe, and other devices that support Bluetooth communication technology. The implementations of Bluetooth gateways 10a presented in FIG. 1 are merely examples and do not impose limits on other implementations.

In various embodiments, a Bluetooth gateway 10a includes at least one processing unit, at least one memory device, and a Bluetooth communication module. The numbers of processing units and memory devices may depend on the Bluetooth gateway configuration and type. Memory may be volatile, such as RAM, or non-volatile, such as read-only memory (ROM) or flash memory (or it may simultaneously include both types). The memory may store an operating system (OS) and one or more applications. It may also store program data. In addition to processing units, memory, and Bluetooth communication modules, Bluetooth gateways 10a may also include network card chips, I/O buses, and audiovisual components. In some embodiments, Bluetooth gateways 10a also include peripheral devices such as keyboards, mice, styluses, printers, displays, and electronic screens. These peripheral devices are well known in the art and need not be discussed in detail here. In some embodiments, one or more of the Bluetooth gateways are the programmed computer system of FIG. 8.

In the example shown in FIG. 1, a server 10b is included. Server 10b may be a conventional server, a cloud server, a cloud host, a virtual data center server, or any other type of server. In some embodiments, server 10b includes one or more processors, one or more hard drives, memory, and system buses. The architecture may be similar to that of a general-purpose computer. In some embodiments, server 10b is the programmed computer system of FIG. 8.

In the example shown in FIG. 1, server 10b collaborates with at least one Bluetooth gateway 10a and can implement the provisioning functions specified in the Bluetooth Mesh Profile Specification. Through a collaborative process, unprovisioned Bluetooth devices can be authorized to access Bluetooth mesh network 10. The provisioning specified in the Bluetooth Mesh Profile Specification is a configuration process whereby unprovisioned Bluetooth devices become member nodes in a Bluetooth mesh network. The provisioning includes the process of providing unprovisioned Bluetooth devices with the provisioning data needed to successfully access the Bluetooth mesh network. In addition to providing unprovisioned Bluetooth devices with provisioning data, the provisioning also includes conducting authentication processes in conjunction with unprovisioned Bluetooth devices. When authentication is successful, an unprovisioned Bluetooth device is given provisioning data. This can ensure the security of the Bluetooth mesh network and raise the security of overall network connection processes. In various embodiments, a two-way authentication process is used with unprovisioned Bluetooth devices.

In various embodiments, Bluetooth gateways 10a in Bluetooth Mesh network 10 detect unprovisioned Bluetooth devices that request access to Bluetooth mesh network 10. These unprovisioned Bluetooth devices that request access to the Bluetooth mesh network and are detected by Bluetooth gateways 10a are, for the sake of descriptive convenience, referred to herein as to-be-authenticated Bluetooth devices. In addition to detecting to-be-authenticated Bluetooth devices, Bluetooth gateways 10a, in various embodiments, transmit information between to-be-authenticated Bluetooth devices and server 10b, providing a communications foundation on which to conduct authentication in conjunction with to-be-authenticated Bluetooth devices. The information transmitted in this context may include various types of information necessary for authentication that are forwarded between to-be-authenticated Bluetooth devices and server 10b. This transmitted information may also include other information forwarded between to-be-authenticated Bluetooth devices and server 10b in the provisioning process.

A to-be-authenticated Bluetooth device may be any device that supports Bluetooth communication technology (e.g., includes Bluetooth transceiver hardware and implements Bluetooth protocol software) and that can access Bluetooth mesh network 10. Examples of to-be-authenticated Bluetooth devices include a Bluetooth lamp, a Bluetooth switch, a Bluetooth socket, a Bluetooth television set, Bluetooth earphones, a Bluetooth audio system, a Bluetooth keyboard, a Bluetooth bracelet, a Bluetooth alarm, a Bluetooth tracker, a Bluetooth thermometer, a Bluetooth heart rate monitor, a Bluetooth sensor, or some other Bluetooth device. In various embodiments, "to-be-authenticated Bluetooth devices" refer to Bluetooth devices that do not yet have access to Bluetooth mesh network 10 and need to conduct authentication in conjunction with server 10b.

Server 10b may conduct authentication in conjunction with to-be-authenticated Bluetooth devices via Bluetooth gateways that have detected to-be-authenticated Bluetooth devices, thus globalizing provisioning authentication. Because server 10b can conduct authentication in conjunction with to-be-authenticated Bluetooth devices, gateway devices can be freed from provisioning authentication, helping to reduce requirements placed on Bluetooth gateways, which helps to reduce difficulties associated with Bluetooth mesh network deployment and thus spur the development of Bluetooth mesh technology.

Bluetooth mesh network 10 in accordance with the present invention allows a user to flexibly position a reasonable number of Bluetooth gateways 10a as needed for a network coverage area. In some application scenarios characterized by a smaller network coverage area, a small number of Bluetooth gateways 10a may be positioned. For example, one Bluetooth gateway 10a may be positioned. In some application scenarios characterized by a large network coverage area, a large number of Bluetooth gateways 10a may be positioned.

In some embodiments, when an unprovisioned Bluetooth device is being prepared for connection to Bluetooth mesh network 10, nearby Bluetooth gateways 10a are notified through broadcasting. The unprovisioned Bluetooth device may externally broadcast a beacon signal if it supports the PB-ADV bearer layer, and it may send connectable broadcast data packets if it supports the PB-GATT bearer layer. When a Bluetooth gateway 10a receives a beacon signal or broadcast data packet, it may confirm detection of the unprovisioned Bluetooth device that sent the beacon signal or broadcast data packet and determine that the unprovisioned Bluetooth device is prepared.

A user may issue detection instructions to Bluetooth gateways 10a. Bluetooth gateways 10a may detect to-be-authenticated Bluetooth devices that request access to Bluetooth mesh network 10 within their signal coverage areas in response to user-issued detection instructions. A user may issue a detection instruction individually to each of the Bluetooth gateways 10a in Bluetooth mesh network 10 so as to instruct all Bluetooth gateways 10a to detect to-be-authenticated Bluetooth devices within their signal coverage areas. For example, after Bluetooth mesh network 10 has been deployed and activated, it may be necessary for each of the Bluetooth gateways 10a to individually detect to-be-authenticated Bluetooth devices within its signal coverage area. At this point, the user may individually issue a detection instruction to each of the Bluetooth gateways 10a in Bluetooth mesh network 10.

A user may also issue a detection instruction to some of the Bluetooth gateways 10a in Bluetooth mesh network 10 so as to instruct these Bluetooth gateways to detect to-be-authenticated Bluetooth devices within their signal coverage areas. For example, a user may add a new Bluetooth lamp at a certain location in a home environment, but the Bluetooth devices in other locations would remain where they are. In such a situation, the user may issue a detection instruction to just the Bluetooth gateway closest to the newly added Bluetooth lamp, triggering that Bluetooth gateway with respect to just the to-be-authenticated Bluetooth devices within its signal coverage area (e.g., the lamp) and thus conserving Bluetooth gateway resources.

In the example of FIG. 1, a Bluetooth gateway may have a touchscreen, in which case a user may issue a detection instruction to the Bluetooth gateway through touch input and/or writing by hand. A Bluetooth gateway may also support speech input, in which case a user may use speech to issue a detection instruction to the Bluetooth gateway. For example, the user may say: "Please begin detection."

In addition to being triggered by a user, a Bluetooth gateway may automatically detect to-be-authenticated Bluetooth devices within its coverage area according to a preconfigured detection scheme. For example, the Bluetooth gateway may periodically detect to-be-authenticated Bluetooth devices within its signal coverage area. The Bluetooth gateway may start detection of to-be-authenticated Bluetooth devices within its signal coverage area at a set detection time. The Bluetooth gateway may start detection of to-be-authenticated Bluetooth devices within its signal coverage area upon detection of a specified trigger event. The trigger event may be a power-on event, an activation event, a user event, or some other event.

Each Bluetooth gateway in Bluetooth mesh network 10 may detect one to-be-authenticated Bluetooth device or multiple to-be-authenticated Bluetooth devices within its signal coverage area, or it may detect no to-be-authenticated Bluetooth devices at all. In addition, because application scenarios vary, the signal coverage areas of the Bluetooth gateways 10a may or may not overlap. When there is overlapping of signal coverage areas of some Bluetooth gateways 10a, the to-be-authenticated Bluetooth devices within the overlapped zones may be detected by two or more Bluetooth gateways 10a. Thus, device identification information about a single to-be-authenticated Bluetooth device would be reported by two or more Bluetooth gateways 10a to server 10b. Server 10b may receive device identification information at different times about the same to-be-authenticated Bluetooth device from two or more Bluetooth gateways 10a. The device identification information of to-be-authenticated Bluetooth devices can include information that can be used to identify to-be-authenticated Bluetooth devices, e.g., a universally unique identifier (UUID) such as a product identifier (ID), media access control (MAC) address, etc. The product ID may be associated with to-be-authenticated Bluetooth device capabilities and other such information.

In some situations, there may be one Bluetooth gateway that detects a to-be-authenticated Bluetooth device, in which case server 10b can conduct authentication in conjunction with the to-be-authenticated Bluetooth device on the basis of that Bluetooth gateway. In other situations, there may be multiple Bluetooth gateways that detect a to-be-authenticated Bluetooth device, in which case server 10b may select one Bluetooth gateway from among the multiple Bluetooth gateways that detect the to-be-authenticated Bluetooth device and conduct authentication in conjunction with the to-be-authenticated Bluetooth device on the basis of the selected Bluetooth gateway. For the sake of descriptive convenience, the Bluetooth gateway that detects a to-be-authenticated Bluetooth device and is ultimately responsible for transmitting information in the authentication process that server 10b conducts in conjunction with the to-be-authenticated Bluetooth device is referred to herein as the "destination Bluetooth gateway."

When there are multiple Bluetooth gateways that detect a to-be-authenticated Bluetooth device, server 10b may select a destination Bluetooth gateway from among the multiple Bluetooth gateways according to the order in which the multiple Bluetooth gateways report device identification information for the to-be-authenticated Bluetooth device, the signal strength from the to-be-authenticated Bluetooth device detected by the multiple Bluetooth gateways, the priority levels of the multiple Bluetooth gateways, a combination of the above, and/or other information. Destination Bluetooth gateway selection is described in further detail in the examples below. These examples are illustrative and not restrictive.

The multiple Bluetooth gateways that detect a to-be-authenticated Bluetooth device may, in addition to reporting device identification information of the to-be-authenticated Bluetooth device to server 10b, report the respective received signal strength indicators (RSSIs) of the to-be-authenticated Bluetooth device that they detect. Server 10b may use the RSSIs of the to-be-authenticated Bluetooth device detected by the Bluetooth gateways as a basis to select a Bluetooth gateway (using RSSIs that reach a signal strength threshold). For example, server 10b may select the Bluetooth gateway with the strongest RSSI as the destination Bluetooth gateway. As another example, server 10b may select the Bluetooth gateway with an RSSI within a specified RSSI range as the destination Bluetooth gateway. As another example, the Bluetooth gateway with an RSSI above a specified RSSI threshold value may be selected as the destination Bluetooth gateway.

A priority level may be pre-allocated for each Bluetooth gateway 10a in Bluetooth mesh network 10. Different Bluetooth gateways 10a would have different priority levels. For example, in Bluetooth mesh network 10, there may be a master gateway, level 1 slave gateways, and level 2 slave gateways. Server 10b may use the priority levels of the multiple Bluetooth gateways that detect a to-be-authenticated Bluetooth device as a basis to select a destination Bluetooth gateway (from among the Bluetooth gateways whose priority levels meet a priority level threshold). For example, server 10b may select the Bluetooth gateway with the highest priority level as the destination Bluetooth gateway.

Consideration may be given to the fact that distances between Bluetooth gateways 10a and a to-be-authenticated Bluetooth device can vary. When multiple Bluetooth gateways detect the to-be-authenticated Bluetooth device, the time at which each Bluetooth gateway detects the to-be-authenticated Bluetooth device can differ, and the order in which the Bluetooth gateways report the device identification information of the to-be-authenticated Bluetooth device to server 10b can differ correspondingly. Server 10b may select the destination Bluetooth gateway based on the order in which device identification information of the to-be-authenticated Bluetooth device is reported by multiple Bluetooth gateways. For example, server 10b may select the Bluetooth gateway which was the first to report the device identification information of the to-be-authenticated Bluetooth device as the destination Bluetooth gateway. As another example, server 10b may select the Bluetooth gateway which was the last to report the device identification information of the to-be-authenticated Bluetooth device as the destination Bluetooth gateway.

After successful two-way authentication between server 10b and the to-be-authenticated Bluetooth device, server 10b may also generate provisioning data for the to-be-authenticated Bluetooth device and issue the to-be-authenticated Bluetooth device provisioning data via the destination Bluetooth gateway, e.g., allow the destination Bluetooth gateway to perform a provisioning operation directed at the to-be-authenticated Bluetooth device.

"Provisioning data" refers to data that a to-be-authenticated Bluetooth device needs to successfully access a Bluetooth mesh network. Examples of such data include NetKey, AppKey, and unicast address data. A NetKey ensures the security of network layer communications and is shared among all member nodes in the network. The possession of a given NetKey defines membership in a given Bluetooth mesh network. In various embodiments, assigning of the network's NetKey on a Bluetooth device is one of the main results of a provisioning operation. "Member nodes" refer to Bluetooth devices that successfully access a Bluetooth mesh network. An "AppKey" is a Bluetooth mesh network application key, e.g., a key for communication between a Bluetooth gateway and a Bluetooth device accessing a Bluetooth mesh network in a specific application scenario (e.g., a residential Bluetooth mesh network application). A "unicast address" is an address used when communicating with other nodes after a to-be-authenticated Bluetooth device successfully accesses a Bluetooth mesh network.

In various embodiments, the provisioning operation performed according to the provisioning data by the destination Bluetooth gateway for the to-be-authenticated Bluetooth device includes the forwarding of provisioning data to the to-be-authenticated Bluetooth device so that the to-be-authenticated Bluetooth device can access Bluetooth mesh network 10. In some embodiments, the "provisioning operation" referred to here includes some of the functions associated with provisioning specified in the Bluetooth Mesh Profile Specification. For example, two-way authentication operations conducted between server 10b and the to-be-authenticated Bluetooth device prior to the provisioning operation may be included.

The existing Bluetooth Mesh Profile Specification establishes several forms of OOB authentication, including: Input OOB, Output OOB, Static OOB, and No OOB. Server 10b may choose to use any form of OOB authentication to perform authentication in conjunction with the to-be-authenticated Bluetooth device. In various embodiments, regardless of which form of OOB authentication is employed, server 10b and the to-be-authenticated Bluetooth device implement authentication functions while the destination Bluetooth gateway forwards information. Bluetooth gateways 10a may also display or output some authentication-related information to a user.

In some embodiments, server 10b employs static OOB authentication to conduct two-way authentication in conjunction with the to-be-authenticated Bluetooth device. In various embodiments, server 10b subjects the to-be-authenticated Bluetooth device to authentication so as to ensure the security of Bluetooth mesh network 10. In various embodiments, the to-be-authenticated Bluetooth device subjects server 10b to authentication so as to ensure the security of the to-be-authenticated Bluetooth device.

To raise the efficiency of two-way authentication and automate two-way authentication, server 10b may maintain the authentication parameters of all registered Bluetooth devices in advance at its end, while each registered Bluetooth device has its own built-in authentication parameters. "Registered Bluetooth devices" are Bluetooth devices that were registered in advance with server 10b (also referred to as legitimate Bluetooth devices). In various embodiments, the aforesaid "authentication parameters" include information needed to generate static OOB information for conducting static OOB authentication. In various embodiments, authentication information is static in the sense that the authentication information is pre-generated and stored on server 10b and Bluetooth devices (and does not need to be generated dynamically when authentication needs to be performed). In various embodiments, the authentication parameters for each Bluetooth device are unique (different Bluetooth devices have different authentication parameters). Static OOB information calculated from different Bluetooth devices would also be unique.

In some embodiments, the authentication parameters include device identification information and an authentication key (secret key). In various embodiments, the secret key is pre-generated and stored on server 10b and on Bluetooth devices (e.g., as described in further detail herein). The "device identification information" includes information that can uniquely identify a Bluetooth device, and can be generated sequentially or using other functions that do not generate repeated numbers. The authentication key in the authentication parameters has a one-to-one correspondence with the device identification information. Thus, it is possible to achieve "one device, one key" to guard against tampering, reverse engineering, and counterfeiting, which helps improve authentication security.

In some embodiments, the device identification information in the authentication parameters includes the Bluetooth device product ID and MAC address. The product ID may identify device capabilities of the Bluetooth device. Different types or models of Bluetooth devices have different product IDs. The same type or model of Bluetooth device may have the same product ID. Authentication parameters may be expressed as a three-tuple information set: (product ID, MAC address, secret key), though authentication parameters are not limited to this three-tuple information set.

Server 10b may make registration functions available to each Bluetooth device manufacturer and generate the aforesaid authentication parameters for Bluetooth devices. In this manner, Bluetooth device manufacturers may send registration requests to server 10b whereby they request that the server 10b generates unique authentication parameters for the Bluetooth devices that they produce or manufacture. They may then build the authentication parameters generated by server 10b into the corresponding Bluetooth devices (referred to herein as authentication parameters built into the to-be-authenticated Bluetooth devices). For example, a manufacturer of a to-be-authenticated Bluetooth device may send a registration request to server 10b prior to producing or manufacturing the to-be-authenticated Bluetooth device in order to request that server 10b generates authentication parameters for the to-be-authenticated Bluetooth device. Server 10b may receive the registration request sent by the manufacturer corresponding to the to-be-authenticated Bluetooth device, use the registration request as a basis for generating and pre-allocating authentication parameters, e.g., three-tuple information (product ID, MAC address, secret key) for the to-be-authenticated Bluetooth device, and send the generated authentication parameters to the manufacturer so that the manufacturer can build the pre-allocated authentication parameters into the to-be-authenticated Bluetooth device (e.g., programming the authentication parameters on a chip in the Bluetooth device) before shipping the to-be-authenticated Bluetooth device from a factory. In various embodiments, after generating the authentication parameters for the registered Bluetooth device, server 10b also maintains the authentication parameters of the registered Bluetooth device at its end. In some embodiments, the manufacturer communicates with server 10b via its terminal devices, though communication is not limited to using terminal devices.

In various embodiments, server 10b, on the basis of the authentication parameters described above, employs a static OOB authentication approach based on the to-be-authenticated Bluetooth device authentication parameters that it maintains at its end and the authentication parameters built into the to-be-authenticated Bluetooth device to conduct two-way authentication in conjunction with the to-be-authenticated Bluetooth device via a destination Bluetooth gateway so that the to-be-authenticated Bluetooth device can securely access Bluetooth mesh network 10. An example process whereby server 10b may conduct two-way authentication in conjunction with a to-be-authenticated Bluetooth device via a destination Bluetooth gateway is as follows:

First, the to-be-authenticated Bluetooth device broadcasts its own device identification information so that a Bluetooth gateway within the Bluetooth mesh network will detect it. After the Bluetooth gateway (destination Bluetooth gateway) detects the to-be-authenticated Bluetooth device, it reports the device identification information of the to-be-authenticated Bluetooth device to server 10b.

Next, server 10b receives the to-be-authenticated Bluetooth device's device identification information, which is reported by the destination Bluetooth gateway. Then server 10b determines the to-be-authenticated Bluetooth device authentication parameters, e.g., the three-tuple information (product ID, MAC address, secret key), from among the authentication parameters of all the registered Bluetooth devices that the server maintains at its end. Then server 10b uses the authentication parameters of the to-be-authenticated Bluetooth device and a server random number to generate first authentication information and forwards the first authentication information and the server random number via the destination Bluetooth gateway to the to-be-authenticated Bluetooth device so that the to-be-authenticated Bluetooth device can subject server 10b to authentication. The "server random number" is a random number (e.g., a pseudorandom number) generated by server 10b that is used to generate first authentication information. The use of a random number in the process of generating first authentication information can prevent brute-force decryptions and helps to improve provisioning authentication security.

It is also possible to generate second authentication information based on the authentication parameters, e.g., three-tuple information (product ID, MAC address, secret key), built into the to-be-authenticated Bluetooth device and a device random number and forward the second authentication information and the device random number via the destination Bluetooth gateway to server 10b so that server 10b can subject the to-be-authenticated Bluetooth device to authentication. The "device random number" is a random number (e.g., a pseudorandom number) generated by the to-be-authenticated Bluetooth device that is used to generate the second authentication information. The use of a random number in the process of generating second authentication information can prevent brute-force decryptions and helps to improve provisioning authentication security.

In some embodiments, the to-be-authenticated Bluetooth device first subjects server 10b to authentication based on the first authentication information and the server random number. If server 10b is authenticated, the to-be-authenticated Bluetooth device forwards the second authentication information and the device random number via the destination Bluetooth gateway to server 10b. If server 10b fails authentication, there is no need to send the second authentication information and device random number to server 10b. This helps to conserve network resources.

Server 10b may receive the second authentication information and a device random number, which are forwarded by the destination Bluetooth gateway. It is also possible that server 10b does not receive the second authentication information and the device random number. Upon receiving the second authentication information and the device random number, which are forwarded by the destination Bluetooth gateway, server 10b may use the second authentication information and the device random number as a basis to subject the to-be-authenticated Bluetooth device to authentication.

In some embodiments, when generating first authentication information, server 10b uses a hashing function (e.g., a cryptographic hash function used in encryption) to hash (including securely hash) the to-be-authenticated Bluetooth device authentication parameters maintained at the server end so as to generate a first authentication value. Then server 10b may generate the first authentication information based on the first authentication value and a server random number. Hashing/encryption functions for use by server 10b include, but are not limited to, Secure Hash Algorithm 256 (SHA256) and Message-Digest algorithm 5 (MD5). For example, with the SHA256 hashing/encryption function and three-tuple information (product ID, MAC address, secret key), the first authentication value may be AuthValue1=top 128 bits of SHA256 applied to (product ID+MAC address+ secret key). In this formula, "AuthValue1" represents the first authentication value, "product ID" represents the to-be-authenticated Bluetooth device product ID maintained by server 10b at its end, "MAC address" represents the to-be-authenticated Bluetooth device MAC address maintained by server 10b at its end, and "secret key" represents the to-be-authenticated Bluetooth device authentication key maintained by server 10b at its end. In addition, the "+" in this formula (and in subsequent instances herein) represents the combining of more than one piece of information, but it does not limit the specific forms of combination. For example, "+" may represent "joined to," "and," "or," or another form of combination. In some embodiments, the first authentication information is calculated using the Advanced Encryption Standard Cypher-Based Message Authentication Code (AES-CMAC) function applied to (Random1∥AuthValue1). AES-CMAC is a cryptographical method of assuring message integrity and authentication (Cypher-Based Message Authentication Code) implemented on the basis of the Advanced Encryption Standard (AES) function. AES-CMAC is merely an example, and calculation of first authentication information is not limited to the use of AES-CMAC. "Random1" is the server random number. As used in this formula and in subsequent instances herein, "∥" represents an operation acting on two operands, such as concatenation (though "∥" is not limited to such and other operations may also be used).

Correspondingly, when generating second authentication information, the to-be-authenticated Bluetooth device may use a hashing/encryption function to hash/encrypt the authentication parameters built into the to-be-authenticated Bluetooth device so as to generate a second authentication value. Then the to-be-authenticated Bluetooth device may generate the second authentication information based on the second authentication value and a device random number. Hashing/encryption functions for use by the to-be-authenticated Bluetooth device include, but are not limited to, SHA256 and MD5. For example, with the SHA256 function and three-tuple information (product ID, MAC address, secret key), the second authentication value may be AuthValue2=top 128 bits of SHA256 applied to (product ID+MAC address+secret key). In this formula, "AuthValue2" represents the second authentication value, "product ID" represents the product ID built into the to-be-authenticated Bluetooth device, "MAC address" represents the MAC address built into the to-be-authenticated Bluetooth device, and "secret key" represents the authentication key built into the to-be-authenticated Bluetooth device. In some embodiments, the second authentication information is calculated using the AES-CMAC function applied to (Random2||AuthValue2). "Random2" is the device random number.

In the two-way authentication process described above, after receiving the first authentication information and server random number, the to-be-authenticated Bluetooth device may subject server 10b to authentication by combining the first authentication information, the server random number, and the authentication parameters built into the to-be-authenticated Bluetooth device. Taking the three-tuple information (product ID, MAC address, secret key) as an example, the to-be-authenticated Bluetooth device may use the same hashing/encryption function used by server 10b to hash/encrypt its built-in three-tuple information so as to generate a temporary authentication value, e.g., AuthValue0=the top 128 bits of SHA256 applied to (product ID+MAC address+secret key). Then temporary authentication information, e.g., AES-CMAC applied to (Random1||AuthValue0), may be calculated. The first authentication information AES-CMAC applied to (Random1||AuthValue1) may be compared to the temporary authentication information AES-CMAC applied to (Random1||AuthValue0). If the temporary authentication information and the first authentication information are the same, the determination may be made that server 10b is authenticated. Conversely, if the temporary authentication information and the first authentication information are not the same, the determination may be made that server 10b failed to be authenticated.

Similarly, server 10b, after receiving the second authentication information and the device random number, may subject the to-be-authenticated Bluetooth device to authentication by combining the second authentication information, the device random number, and the to-be-authenticated Bluetooth device authentication parameters maintained at its end. Taking the three-tuple information (product ID, MAC address, secret key) as an example, server 10b may use the same hashing/encryption function used by the to-be-authenticated Bluetooth device to hash/encrypt the three-tuple information of the to-be-authenticated Bluetooth device maintained at its end so as to generate a temporary authentication value, e.g., AuthValue0=the top 128 bits of SHA256 applied to (product ID+MAC address+secret key). Then temporary authentication information, e.g., AES-CMAC applied to (Random2||AuthValue0), may be calculated. The second authentication information AES-CMAC applied to (Random2||AuthValue2) may be compared to the temporary authentication information AES-CMAC applied to (Random2||AuthValue0). If the temporary authentication information and the second authentication information are the same, the determination may be made that the to-be-authenticated Bluetooth device is authenticated. Conversely, if the temporary authentication information and the second authentication information are not the same, the determination may be made that the to-be-authenticated Bluetooth device failed to be authenticated.

The sequence whereby the aforesaid destination Bluetooth gateway forwards information between server 10b and the to-be-authenticated Bluetooth device may be according to a sequence established in the Bluetooth Mesh Profile Specification. When a change occurs in the information exchange sequence specified in the Bluetooth Mesh Profile Specification, the sequence whereby the destination Bluetooth gateway forwards information may change adaptively.

In the examples described above, the server may combine to-be-authenticated Bluetooth device authentication parameters maintained at its end and authentication parameters built into the to-be-authenticated Bluetooth device in employing a static OOB authentication approach to conduct two-way authentication in conjunction with the to-be-authenticated Bluetooth device. The static OOB authentication process does not require user intervention. The automation of provisioning authentication that is thus achieved helps to improve user experience and increases provisioning authentication efficiency. In addition, the fact that different Bluetooth devices correspond to different pieces of static OOB information helps to ensure the security of the provisioning authentication process.

The current invention includes various methods, processes, etc. associated with FIG. 1. Bluetooth mesh network provisioning authentication is further described below (from the perspective of a server, a destination Bluetooth gateway, and a to-be-authenticated Bluetooth device).

Figure 2:
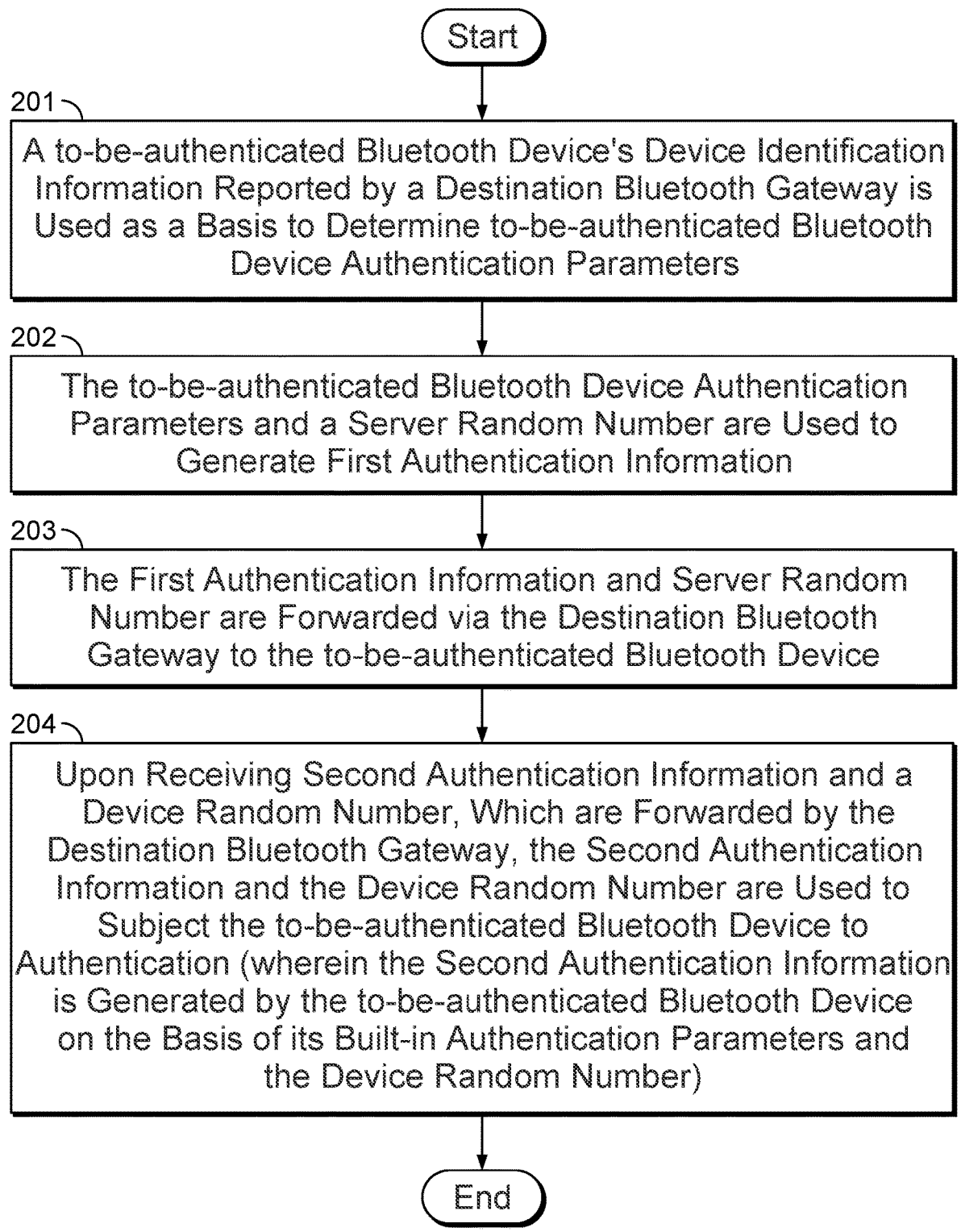
FIG. 2 is a flow chart illustrating an embodiment of a process for performing provisioning authentication in a Bluetooth mesh network from the perspective of a server.

FIG. 2 is a flow chart illustrating an embodiment of a process for performing provisioning authentication in a Bluetooth mesh network from the perspective of a server. In some embodiments, this processed is performed by server 10b of Bluetooth mesh network 10 of FIG. 1.

At 201, a to-be-authenticated Bluetooth device's device identification information reported by a destination Bluetooth gateway is used as a basis to determine the to-be-authenticated Bluetooth device authentication parameters maintained at the server end (e.g., by server 10b of FIG. 1). The destination Bluetooth gateway is the Bluetooth gateway that detected the to-be-authenticated Bluetooth device in the Bluetooth mesh network. In some embodiments, the to-be-authenticated Bluetooth device's device identification information is broadcasted at 401 of FIG. 4. In some embodiments, the broadcasted information is detected by the destination Bluetooth gateway at 301 of FIG. 3 and reported to the server at 302 of FIG. 3.

At 202, the to-be-authenticated Bluetooth device authentication parameters (maintained at the server end) and a server random number are used to generate first authentication information. A hashing/encryption function may be used to hash/encrypt the to-be-authenticated Bluetooth device authentication parameters maintained at the server end so as to generate a first authentication value. The first authentication information may be generated on the basis of the first authentication value and a server random number. In some embodiments, authentication parameters are in the form of a three-tuple information set of (product ID, MAC address, secret key).

Taking the three-tuple information (product ID, MAC address, secret key) as an example, generating a first authentication value may include using a hashing/encryption function, e.g., SHA256 or MD5, to hash/encrypt the three-tuple information (product ID, MAC address, secret key), e.g., SHA256 applied to (product ID+MAC address+secret key), and then taking the top 128 bits of the hashing/encryption results to be the first authentication value (AuthValue1). The "+" in the above formula represents the combining of more than one piece of information, but it does not limit the specific forms of combination. For example, "+" may represent "joined to," "and," "or," or another form of combination. In some embodiments, the first authentication information is calculated using AES-CMAC applied to (Random1||AuthValue1). Here, "Random1" is the server random number, and "AuthValue1" is the first authentication value.

At 203, the first authentication information and the server random number are forwarded via the destination Bluetooth gateway to the to-be-authenticated Bluetooth device (so that the to-be-authenticated Bluetooth device can subject the server to authentication). In some embodiments, the first authentication information and the server random number are received by the destination Bluetooth gateway at 303 of FIG. 3 and forwarded to the to-be-authenticated Bluetooth device at 304 of FIG. 3. In some embodiments, the to-be-authenticated Bluetooth device uses the first authentication information and the server random number to subject the server to authentication at 402 of FIG. 4. The server may send the first authentication information and the server random number in the same communication process to the destination Bluetooth gateway. Alternatively, the destination Bluetooth gateway may first forward the first authentication information to the to-be-authenticated Bluetooth device and then, after receiving second authentication information sent by the to-be-authenticated Bluetooth device, forward the server random number to the to-be-authenticated Bluetooth device. Correspondingly, after receiving a device random number sent by the to-be-authenticated Bluetooth device in step 204, the destination Bluetooth gateway may forward the second authentication information and device random number to the server in the same communication process.

At 204, upon receiving second authentication information and a device random number, which are forwarded by the destination Bluetooth gateway, the second authentication information and the device random number are used to subject the to-be-authenticated Bluetooth device to authentication (wherein the second authentication information is generated by the to-be-authenticated Bluetooth device on the basis of its built-in authentication parameters and the device random number). In some embodiments, the second authentication information and the device random number are generated by the to-be-authenticated device at 403 of FIG. 4 and sent by the to-be-authenticated Bluetooth device to the destination Bluetooth gateway at 404 of FIG. 4. In some embodiments, the second authentication information and the device random number are forwarded by the destination Bluetooth gateway to the server at 305 of FIG. 3.

In some embodiments, prior to step 201, authentication parameters for the to-be-authenticated Bluetooth device are generated and pre-allocated and the authentication parameters of the to-be-authenticated Bluetooth device are locally maintained. In some embodiments, authentication parameters generated for the to-be-authenticated Bluetooth device are provided to the manufacturer of the to-be-authenticated Bluetooth device so that the manufacturer can build the authentication parameters into the to-be-authenticated Bluetooth device. In some embodiments, a registration request sent by the manufacturer corresponding to the to-be-authenticated device is received, and the registration request serves as a basis to generate authentication parameters for the to-be-authenticated Bluetooth device.

In the example shown in FIG. 2, Bluetooth device authentication parameters maintained at the server end are combined with authentication parameters built into the Bluetooth device in employing a static OOB authentication approach to complete mutual authentication with the to-be-authenticated Bluetooth device. This provides a foundation for Bluetooth devices to securely access a Bluetooth mesh network. During the static OOB authentication process, the user does not need to intervene. The automation that is thus achieved helps to improve user experience and increases provisioning authentication efficiency. In addition, the fact that different Bluetooth devices correspond to different pieces of static OOB information helps to ensure the security of the provisioning authentication process.

Figure 3:
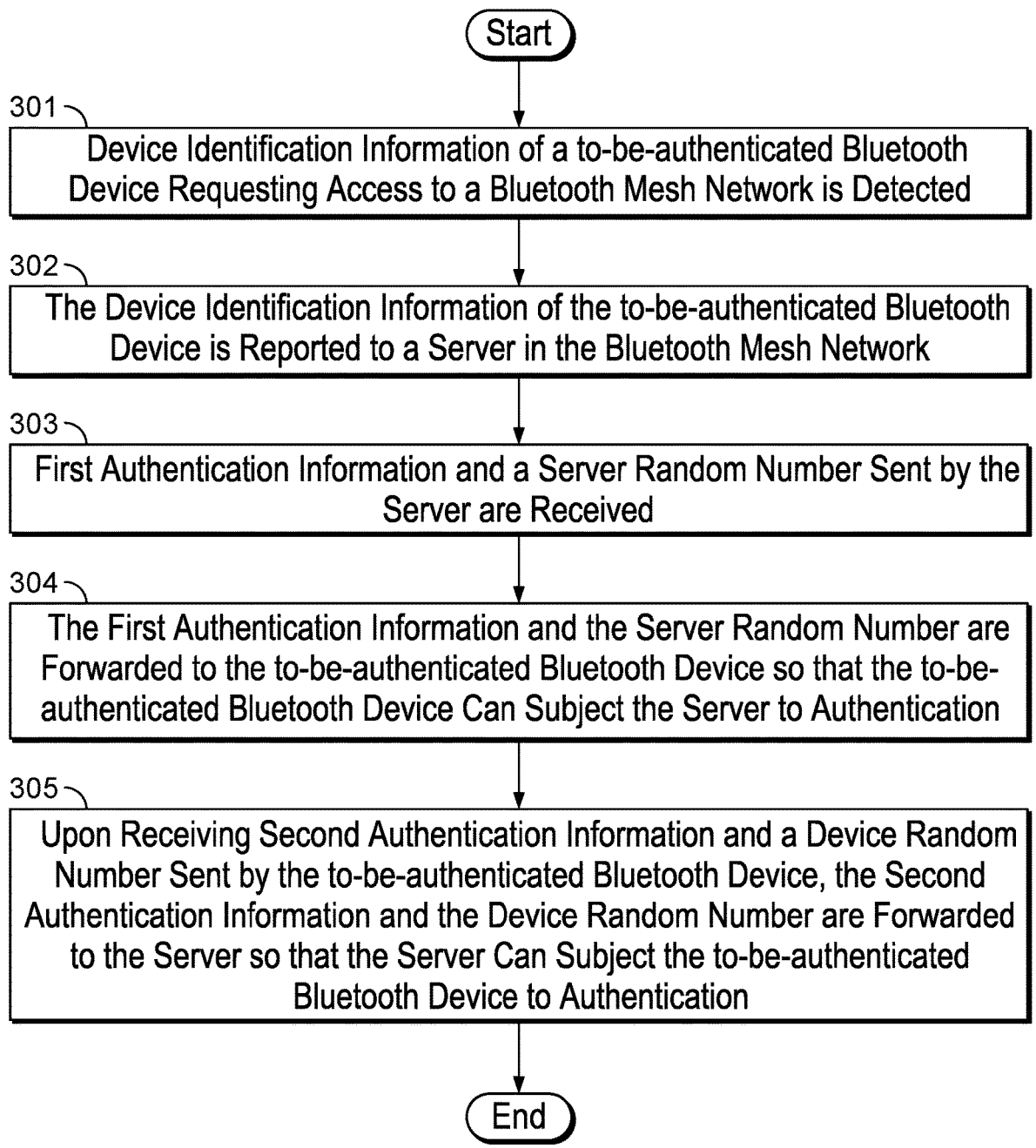
FIG. 3 is a flow chart illustrating an embodiment of a process for performing provisioning authentication in a Bluetooth mesh network from the perspective of a destination Bluetooth gateway.

FIG. 3 is a flow chart illustrating an embodiment of a process for performing provisioning authentication in a Bluetooth mesh network from the perspective of a destination Bluetooth gateway. The destination Bluetooth gateway is a Bluetooth gateway in the Bluetooth mesh network. In some embodiments, this process is performed by one of Bluetooth gateways 10a of Bluetooth mesh network 10 of FIG. 1.

At 301, device identification information of a to-be-authenticated Bluetooth device requesting access to a Bluetooth mesh network is detected. In some embodiments, the device identification information is broadcasted by the to-be-authenticated Bluetooth device at 401 of FIG. 4.

At 302, the device identification information of the to-be-authenticated Bluetooth device is reported to a server in the Bluetooth mesh network. In some embodiments, the device identification information is received by the server at 201 of FIG. 2.

At 303, first authentication information and a server random number sent by the server are received. In various embodiments, the first authentication information is generated by the server from to-be-authenticated Bluetooth device authentication parameters maintained at the server end and the server random number. In some embodiments, the first authentication information and the server random number are generated by the server at 202 of FIG. 2 and sent by the server at 203 of FIG. 2.

At 304, the first authentication information and the server random number are forwarded to the to-be-authenticated Bluetooth device so that the to-be-authenticated Bluetooth device can subject the server to authentication. In some embodiments, the first authentication information and the server random number are received by the to-be-authenticated Bluetooth device at 402 of FIG. 4.

At 305, upon receiving second authentication information and a device random number sent by the to-be-authenticated Bluetooth device, the second authentication information and the device random number are forwarded to the server so that the server can subject the to-be-authenticated Bluetooth device to authentication. In various embodiments, the second authentication information is generated by the to-be-authenticated Bluetooth device on the basis of its built-in authentication parameters and the device random number. In some embodiments, the second authentication information and the device random number are generated at 403 of FIG.

Figure 4:
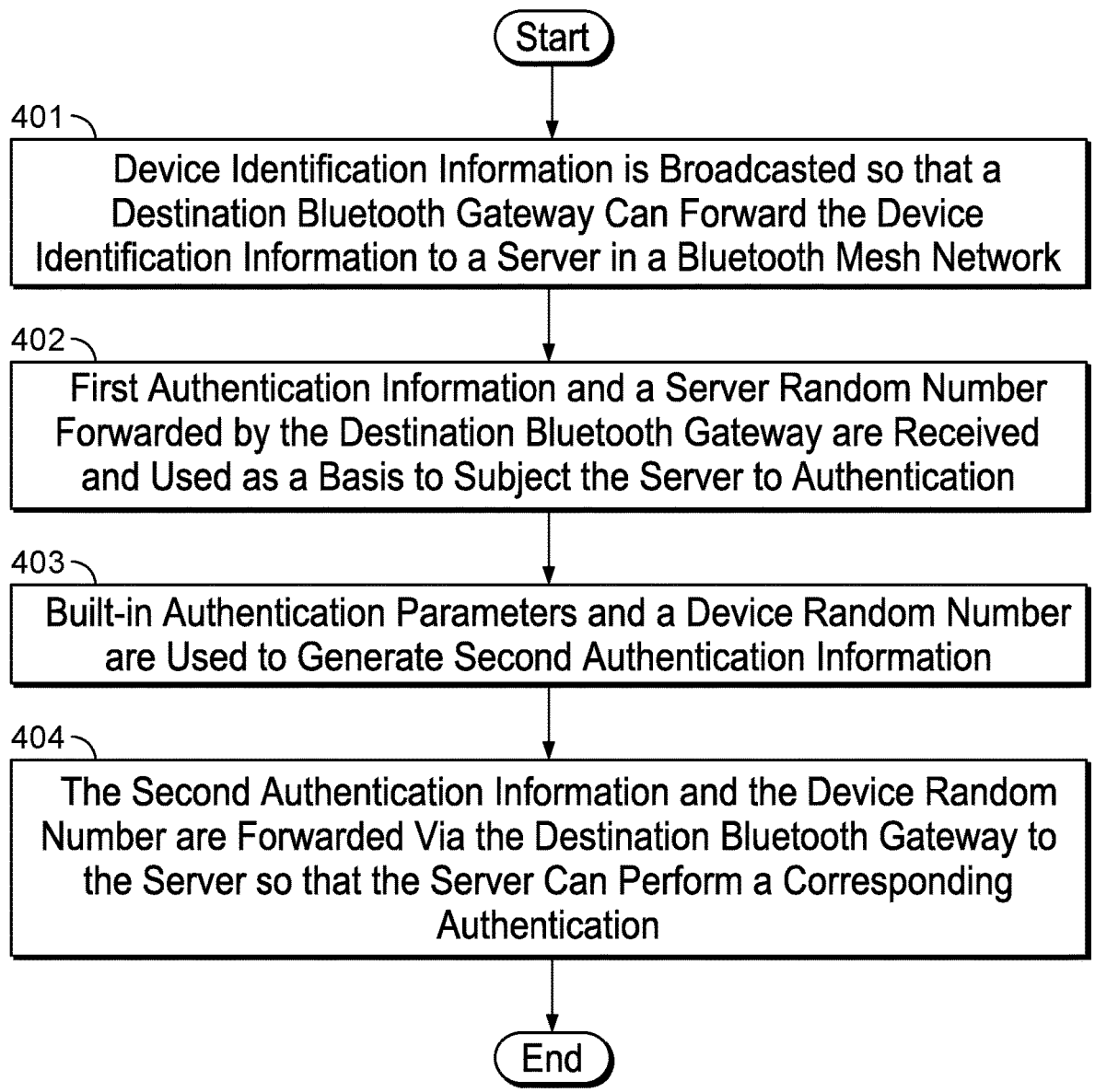
FIG. 4 is a flow chart illustrating an embodiment of a process for performing provisioning authentication in a Bluetooth mesh network from the perspective of a to-be-authenticated Bluetooth device.

4 and sent to the destination Bluetooth gateway at 404 of FIG. 4. In some embodiments, the second authentication information and the device random number are received by the server and used by the server to subject the to-be-authenticated Bluetooth device to authentication at 204 of FIG. 2.

In step 304 and step 305, the destination Bluetooth gateway may first forward the first authentication information to the to-be-authenticated Bluetooth device and then receive the second authentication information sent by the to-be-authenticated Bluetooth device. After receiving the second authentication information, the destination Bluetooth gateway may forward the server random number to the to-be-authenticated Bluetooth device. The to-be-authenticated Bluetooth device may first subject the server to authentication based on the first authentication information and the server random number. In various embodiments, authentication is performed by matching authentication information known only to the server and the to-be-authenticated Bluetooth device (such as matching the first authentication information and matching the second authentication information). After the server is authenticated, the to-be-authenticated Bluetooth device may send the device random number to the destination Bluetooth gateway. After receiving a device random number in step 305, the destination Bluetooth gateway may forward the second authentication information and the device random number to the server in the same communication process.

In the example shown in FIG. 3, the destination Bluetooth gateway transmits information between the server and the to-be-authenticated Bluetooth device and thus provides a communication foundation for a static OOB authentication approach in which the server combines Bluetooth device authentication parameters maintained at its end and authentication parameters built into the to-be-authenticated Bluetooth device to complete mutual authentication with the to-be-authenticated Bluetooth device.

FIG. 4 is a flow chart illustrating an embodiment of a process for performing provisioning authentication in a Bluetooth mesh network from the perspective of a to-be-authenticated Bluetooth device. In some embodiments, this process is performed by one of the Bluetooth devices in Bluetooth mesh network 10 of FIG. 1 (e.g., Bluetooth lamp, Bluetooth television set, Bluetooth switch, Bluetooth socket, Bluetooth alarm, etc.).

At 401, device identification information is broadcasted by the to-be-authenticated Bluetooth device (e.g., the to-be-authenticated Bluetooth device broadcasts a wireless signal carrying Bluetooth device identification information) so that a destination Bluetooth gateway can forward the device identification information to a server in a Bluetooth mesh network. In various embodiments, the destination Bluetooth gateway is the Bluetooth gateway that detected the to-be-authenticated Bluetooth device in the Bluetooth mesh network. In some embodiments, the device identification information is detected by the destination Bluetooth gateway at 301 of FIG. 3 and reported to the server at 302 of FIG. 3.

At 402, first authentication information and a server random number forwarded by the destination Bluetooth gateway are received by the to-be-authenticated Bluetooth device and used as a basis to subject the server to authentication. In various embodiments, the first authentication information is generated by the server on the basis of server-maintained authentication parameters of the to-be-authenticated Bluetooth device and the server random number. In some embodiments, the first authentication information and the server random number are generated by the server at 202 of FIG. 2 and sent to the destination Bluetooth gateway at 203 of FIG. 2. In some embodiments, the first authentication information and the server random number are forwarded by the destination Bluetooth gateway to the to-be-authenticated Bluetooth device at 304 of FIG. 3.

At 403, built-in authentication parameters and a device random number are used to generate second authentication information. In some embodiments, a hashing/encryption function is used to hash/encrypt the authentication parameters built into the to-be-authenticated Bluetooth device so as to generate a second authentication value, and then the second authentication information is generated on the basis of the second authentication value and a device random number. In some embodiments, authentication parameters are a set of three-tuple information: (product ID, MAC address, secret key).

Taking the three-tuple information (product ID, MAC address, secret key) as an example, generating a second authentication value may include using a hashing/encryption function, e.g., SHA256 or MD5, to hash/encrypt the three-tuple information (product ID, MAC address, secret key), e.g., SHA256 applied to (Product ID+MAC+Secret) and then taking the top 128 bits of the hashing/encryption results to be the second authentication value. In various embodiments, the same hashing/encryption function that is used to generate the first authentication value is used to generate the second authentication value. The "+" in the above formula represents the combining of more than one piece of information, but it does not limit the specific forms of combination. For example, the "+" may represent "joined to," "and," "or," or another form of combination. In some embodiments, the second authentication information is calculated using AES-CMAC applied to (Random2∥AuthValue2). Here, "Random2" is the device random number, and "AuthValue2" is the second authentication value.

At 404, the second authentication information and the device random number are forwarded by the to-be-authenticated Bluetooth device via the destination Bluetooth gateway to the server so that the server can perform a corresponding authentication (e.g., so that the server can subject the to-be-authenticated Bluetooth device to authentication). To perform authentication, the server needs the device random number in order to generate matching authentication information, which is why the device random number is also sent. In some embodiments, the second authentication information and the device random number are forwarded by the destination Bluetooth gateway to the server at 305 of FIG. 3 and received by the server and used by the server to subject the to-be-authenticated Bluetooth device to authentication at 204 of FIG. 2.

In the example shown in FIG. 4, the to-be-authenticated Bluetooth device employs a static OOB authentication approach based on built-in authentication parameters to complete mutual authentication with a server and thus allows itself to securely access a Bluetooth mesh network. There is no time during the static OOB authentication process when a user must intervene. The automation that is thus achieved helps to improve user experience and increases provisioning authentication efficiency.

Figure 5:
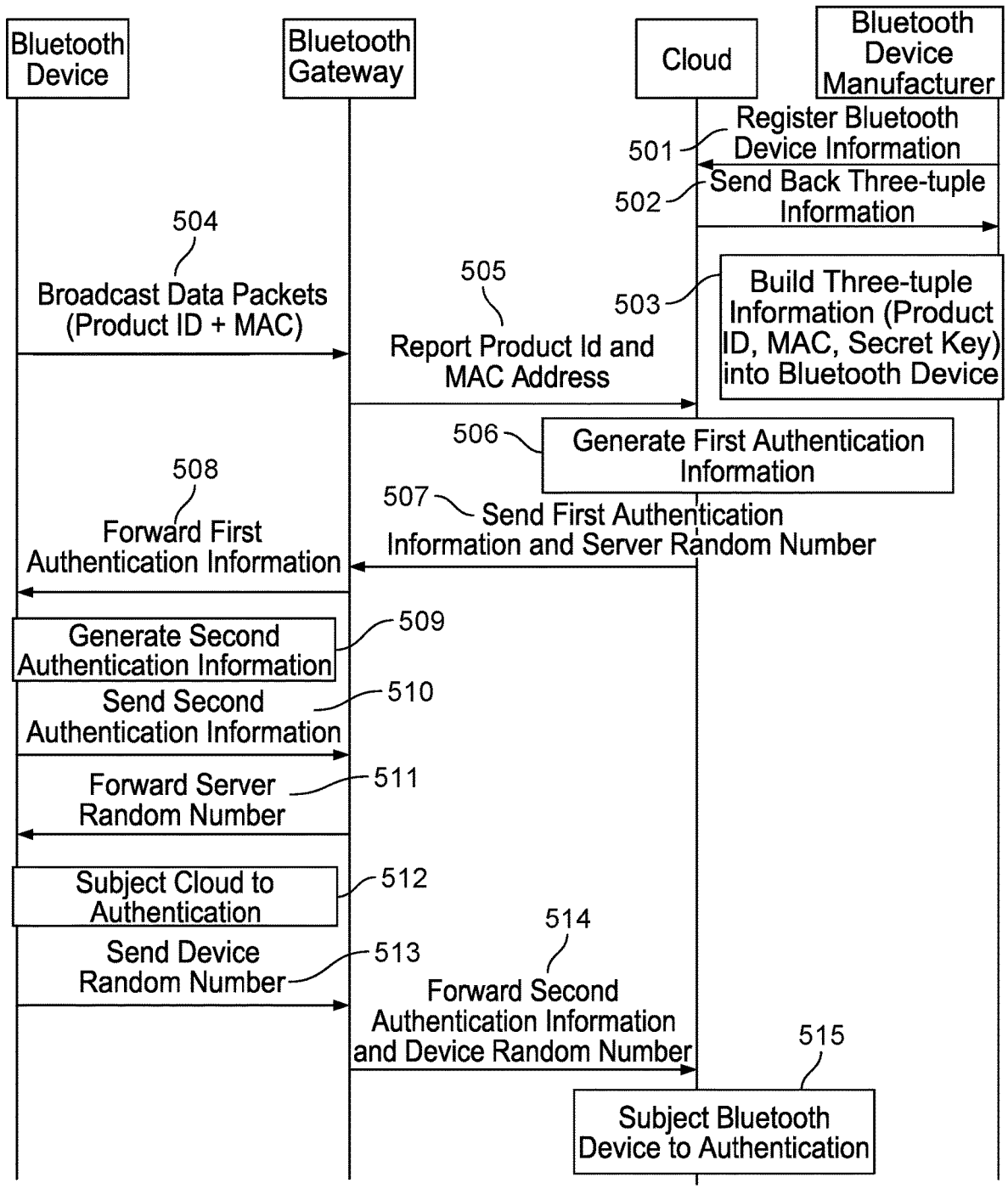
FIG. 5 is a flow chart illustrating an embodiment of a process for performing three tuple-based provisioning authentication in a Bluetooth mesh network.

FIG. 5 is a flow chart illustrating an embodiment of a process for performing three tuple-based provisioning authentication in a Bluetooth mesh network. In the example shown in FIG. 5, a server is deployed on the cloud and is thus abbreviated as "the cloud." As shown in FIG. 5, the process includes the following steps:

501: A Bluetooth device manufacturer sends a registration request to the cloud so as to register information about a Bluetooth device, e.g., a Bluetooth lamp.

502: The cloud uses the registration request as a basis to generate three-tuple information—a product ID (e.g., one number per model), a MAC address, and an authentication key (secret key) that corresponds in one-to-one fashion with the MAC address—for the Bluetooth device and sends the three-tuple information back to the manufacturer. The three-tuple information is subsequently used in authentication.

503: The manufacturer builds the three-tuple information into the Bluetooth device, e.g., burns it into the Bluetooth device before shipping it from a factory.

504: After a Bluetooth device is plugged in, it broadcasts data packets. These data packets may include the product ID and MAC address built into the Bluetooth device.

505: After a Bluetooth gateway detects the Bluetooth device's broadcast data packets, it reports the product ID and MAC address to the cloud.

506: The cloud uses the product ID and MAC address reported by the Bluetooth gateway as a basis to determine the Bluetooth device's three-tuple information (Product ID1, MAC1, Secret Key1) maintained in the cloud. In various embodiments, by combining the three-tuple information with a server random number (Random1), the cloud generates first authentication information, e.g., AES-CMAC applied to (Random1∥AuthValue1). In some embodiments, AuthValue 1 is the top 128 bits of SHA256 applied to (Product ID1+MAC1+Secret Key1).

507: The cloud sends the first authentication information and the server random number to the Bluetooth gateway.

508: The Bluetooth gateway forwards the first authentication information to the Bluetooth device.

509: In various embodiments, the Bluetooth device generates second authentication information, e.g., AES-CMAC applied to (Random2∥AuthValue2) from its built-in three-tuple information (Product ID2, MAC2, Secret Key2) and a device random number (Random2). In some embodiments, AuthValue 2 is the top 128 bits of SHA256 applied to (Product ID2+MAC2+Secret2).

510: The Bluetooth device sends the second authentication information to the Bluetooth gateway.

511: The Bluetooth gateway forwards the server random number to the Bluetooth device.

512: In various embodiments, the Bluetooth device subjects the cloud to authentication based on the server random number, the first authentication information, and the three-tuple information (Product ID2, MAC2, Secret Key2) built into the Bluetooth device.

513: After the cloud is authenticated, the Bluetooth device sends the device random number to the Bluetooth gateway.

514: The Bluetooth gateway forwards the second authentication information and the device random number to the cloud.

515: In various embodiments, the cloud subjects the Bluetooth device to authentication based on the device random number, the second authentication information, and the three-tuple information (Product ID1, MAC1, Secret Key1) maintained in the cloud.

In the description of the example shown in FIG. 5, "1" and "2" labels are used to refer to and differentiate between the Bluetooth device three-tuple information maintained by the cloud and the three-tuple information built into the Bluetooth device. In various embodiments, the two sets of three-tuple information are the same.

In the example shown in FIG. 5, the cloud may combine the Bluetooth device three-tuple information maintained at its end with the three-tuple information built into the Bluetooth device in employing a static OOB authentication approach to conduct two-way authentication with the Bluetooth device. During the static OOB authentication process, a user does not need to intervene. The automation of provisioning authentication that is thus achieved helps to improve user experience and increases provisioning authentication efficiency. In addition, the fact that different Bluetooth devices correspond to different pieces of static OOB information helps to ensure the security of the provisioning authentication process.

With respect to the examples shown in FIGS. 2-5, each step performed may be performed by different devices in different embodiments. For example, steps 401 through 403 of FIG. 4 may be performed by a single device in one embodiment. In another embodiment, steps 401 and 402 of FIG. 4 may be performed by one device and step 403 of FIG. 4 may be performed by another device.

Although the descriptions and drawings associated with FIGS. 2-5 may appear to set out actions according to a specific sequence, these actions may be performed according to a sequence other than the one that appears in the text or drawings, and the actions may also be performed in parallel. For example, sequence numbers 401 and 402 in FIG. 4 merely serve to differentiate the different actions (of 401 and 402) from each other. The sequence numbers themselves do not represent any sequence of execution. Furthermore, the examples shown in FIGS. 2-5 may include more or fewer actions than shown, and these actions may be performed sequentially or in parallel. Descriptors such as "first," "second," and so forth are intended to serve to differentiate different messages, devices, modules, etc. and do not represent a sequence, nor do they indicate that the "first," "second," and so forth messages, devices, modules, etc. must be different types of messages, devices, modules, etc., respectively.

Figure 6A:
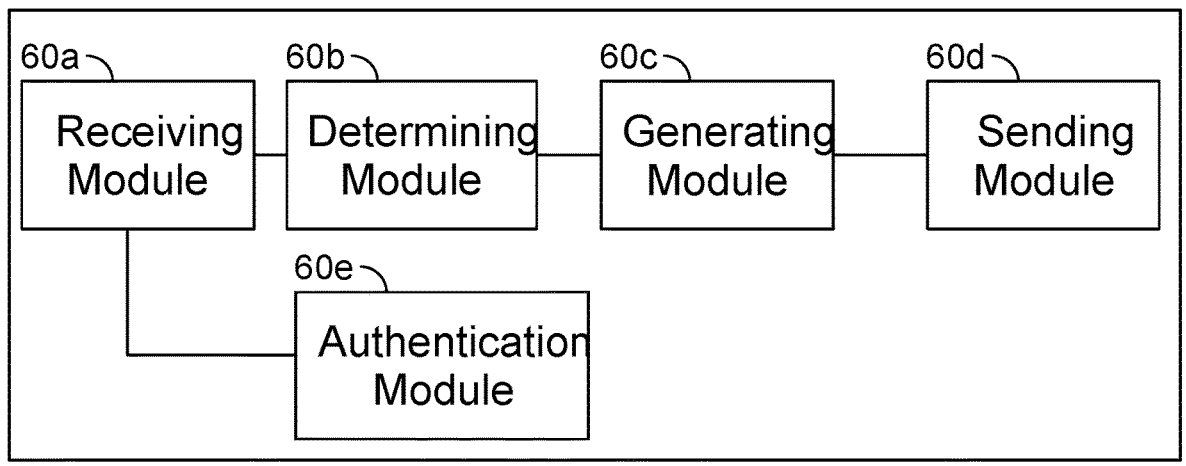
FIG. 6a is a diagram illustrating an embodiment of modules for provisioning authentication from a server perspective.

FIG. 6a is a diagram illustrating an embodiment of modules for provisioning authentication from a server perspective. In some embodiments, the provisioning authentication modules are implemented as functional modules of server 10b of Bluetooth mesh network 10 of FIG. 1. In some embodiments, the provisioning authentication modules are implemented in devices that are independent of, but communicatively connected to, a server. The example shown in FIG. 6a includes receiving module 60a, determining module 60b, generating module 60c, sending module 60d, and authentication module 60e.

The modules can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

In some embodiments, receiving module 60a receives device identification information of a to-be-authenticated Bluetooth device that requests access to a Bluetooth mesh network (as reported by a destination Bluetooth gateway). The destination Bluetooth gateway is a Bluetooth gateway that detects a to-be-authenticated Bluetooth device in the Bluetooth mesh network In some embodiments, determining module 60b uses the to-be-authenticated Bluetooth device's device identification information received by receiving module 60a as a basis to determine server-maintained authentication parameters of the to-be-authenticated Bluetooth device.

In some embodiments, generating module 60c uses the server-maintained to-be-authenticated Bluetooth device authentication parameters and a server random number to generate first authentication information.

In some embodiments, generating module 60c uses a hashing/encryption function to hash/encrypt the server-maintained authentication parameters of the to-be-authenticated Bluetooth device so as to generate a first authentication value and generate first authentication information based on the first authentication value and a server random number. Authentication parameters may be three-tuple information: (product ID, MAC address, secret key). Taking the three-tuple information (product ID, MAC address, secret key) as an example, when generating a first authentication value, generating module 60c may use a hashing/encryption function, e.g., SHA256 or MD5, to hash/encrypt the three-tuple information (product ID, MAC address, secret key), e.g., SHA256 applied to (product ID+MAC address+secret key), and then take the top 128 bits of the hashing/encryption results to be the first authentication value. The "+" in the above formula represents the combining of more than one piece of information, but it does not limit the specific forms of combination. For example, the "+" may represent "joined to," "and," "or," or another form of combination. In some embodiments, when generating first authentication information, generating module 60c uses AES-CMAC applied to (Random1∥AuthValue1) to calculate the first authentication information. In this formula, "Random1" is the server random number, and "AuthValue1" is the first authentication value.

In some embodiments, sending module 60d forwards the first authentication information and the server random number via the destination Bluetooth gateway to the to-be-authenticated Bluetooth device so that the to-be-authenticated Bluetooth device can subject the server to authentication.

In some embodiments, receiving module 60a also receives second authentication information and a device random number, which are forwarded by the destination Bluetooth gateway, wherein the second authentication information is generated by the to-be-authenticated Bluetooth device on the basis of its built-in authentication parameters and the device random number.

In some embodiments, authentication module 60e, after receiving module 60a receives the second authentication information and device random number, uses the second authentication information and the device random number as a basis to subject the to-be-authenticated Bluetooth device to authentication.

In some embodiments, an allocating module (not shown in FIG. 6a) for pre-allocating authentication parameters for to-be-authenticated Bluetooth devices and maintaining the authentication parameters of the to-be-authenticated Bluetooth devices at the server end, is also included. In some embodiments, sending module 60d provides authentication parameters pre-allocated by the allocating module for to-be-authenticated Bluetooth devices to the manufacturers of the to-be-authenticated Bluetooth devices so that the manufacturers can build the authentication parameters into the to-be-authenticated Bluetooth devices. In some embodiments, receiving module 60a receives a registration request sent by the manufacturer corresponding to a to-be-authenticated Bluetooth device. The allocating module may use the registration request to pre-allocate authentication parameters for the to-be-authenticated Bluetooth device.

Figure 6B:
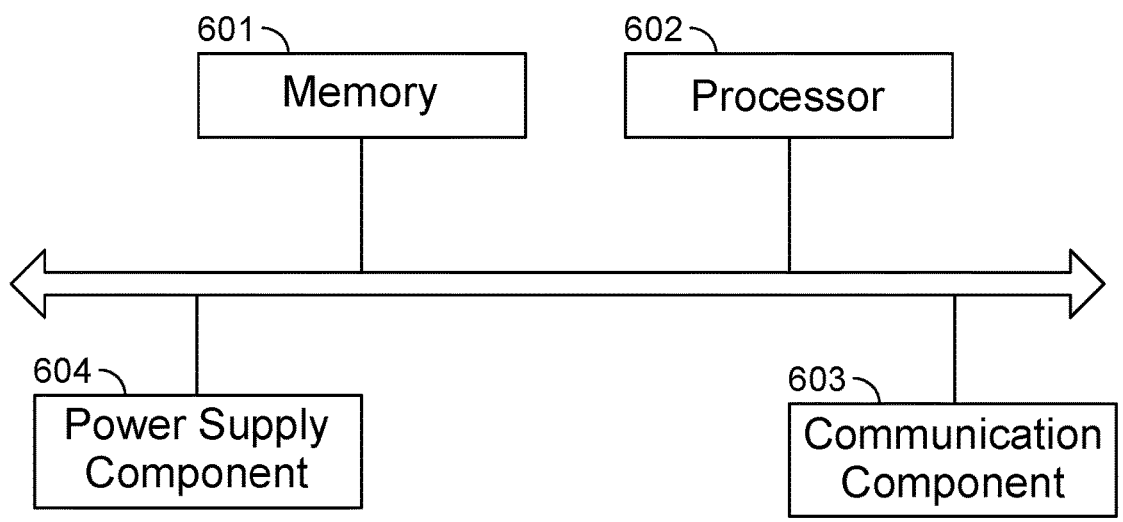
FIG. 6b is a diagram illustrating an embodiment of a server.

FIG. 6b is a diagram illustrating an embodiment of a server. In some embodiments, the server illustrated in FIG. 6b is server 10b of Bluetooth mesh network 10 of FIG. 1. In the example shown, the server includes memory 601, processor 602, and communication component 603.

In various embodiments, communication component 603 receives device identification information of a to-be-authenticated Bluetooth device that requests access to a Bluetooth mesh network (as reported by a destination Bluetooth gateway). The destination Bluetooth gateway is a Bluetooth gateway that detects a to-be-authenticated Bluetooth device in the Bluetooth mesh network.

In various embodiments, memory 601 stores computer programs and is configured to store other kinds of data to support operations on the server. Examples of this data include instructions of any application program or method used in server operations, e.g., authentication parameters of various registered Bluetooth devices, contact data, telephone directory data, messages, pictures, and video.

In various embodiments, processor 602, coupled to memory 601, executes computer programs in memory 601, e.g., for using the device identification information of the to-be-authenticated Bluetooth device as a basis to determine server-maintained authentication parameters of the to-be-authenticated Bluetooth device, using the authentication parameters of the to-be-authenticated Bluetooth device (maintained by the server) and a server random number to generate first authentication information, forwarding the first authentication information and the server random number via the destination Bluetooth gateway to the to-be-authenticated Bluetooth device so that the to-be-authenticated Bluetooth device can subject the server to authentication, receiving second authentication information and a device random number (forwarded by the destination Bluetooth gateway via communication component 603), and using the second authentication information and the device random number as a basis to subject the to-be-authenticated Bluetooth device to authentication. In various embodiments, the second authentication information is generated by the to-be-authenticated Bluetooth device from its built-in authentication parameters and a device random number.

In some embodiments, processor 602 uses a hashing/encryption function to hash/encrypt the server-maintained authentication parameters of the to-be-authenticated Bluetooth device so as to generate a first authentication value and generate first authentication information based on the first authentication value and a server random number. Authentication parameters may be three-tuple information: (product ID, MAC address, secret key). Taking the three-tuple information (product ID, MAC address, secret key) as an example, when generating a first authentication value, processor 602 may use a hashing/encryption function, e.g., SHA256 or MD5, to hash/encrypt the three-tuple information (product ID, MAC address, secret key), e.g., SHA256 applied to (product ID+MAC address+secret key) and then take the top 128 bits of the hashing/encryption results to be the first authentication value. The "+" in the above formula represents the combining of more than one piece of information, but it does not limit the specific forms of combination. For example, the "+" may represent "joined to," "and," "or," or another form of combination. In some embodiments, when generating first authentication information, processor 602 uses AES-CMAC applied to (Random1∥AuthValue1) to calculate the first authentication information. In this formula, "Random1" is the server random number, and "AuthValue1" is the first authentication value.

In some embodiments, processor 602 pre-allocates authentication parameters for to-be-authenticated Bluetooth devices and maintains the authentication parameters of the to-be-authenticated Bluetooth devices at the server end. Communication component 603 may provide authentication parameters pre-allocated by processor 602 for the to-be-authenticated Bluetooth devices to the manufacturers of the to-be-authenticated Bluetooth devices so that the manufacturers can build the authentication parameters into the to-be-authenticated Bluetooth devices. Communication component 603 may receive a registration request sent by a manufacturer corresponding to a to-be-authenticated device. Correspondingly, processor 602 may use the registration request to pre-allocate authentication parameters for the to-be-authenticated Bluetooth device.

The server of FIG. 6b also includes power supply component 604 and other components that are not shown. FIG. 6b schematically presents only some of the components; other components that are not shown may also be present.

In some embodiments, a computer-readable medium storing computer programs is used. When executed, the computer programs are capable of implementing all the steps executable by the server as described above.

Figure 7A:
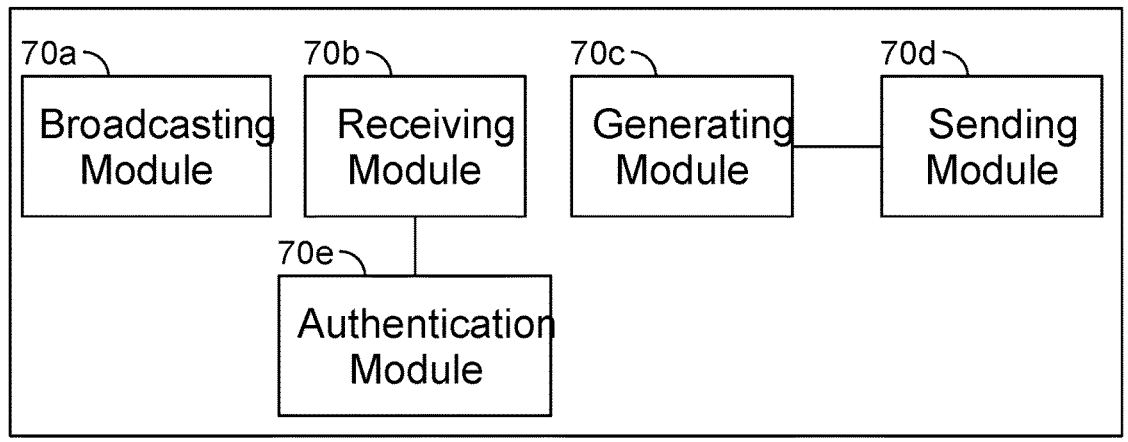
FIG. 7a is a diagram illustrating an embodiment of modules for provisioning authentication from a to-be-authenticated Bluetooth device perspective.

FIG. 7a is a diagram illustrating an embodiment of modules for provisioning authentication from a to-be-authenticated Bluetooth device perspective. In some embodiments, the provisioning authentication modules are implemented as functional modules of one of the Bluetooth devices in Bluetooth mesh network 10 of FIG. 1 (e.g., Bluetooth lamp, Bluetooth television set, Bluetooth switch, Bluetooth socket, Bluetooth alarm, etc.). The provisioning authentication modules may be implemented in a to-be-authenticated Bluetooth device or a device independent of, but communicatively connected to, the to-be-authenticated Bluetooth device. The example shown in FIG. 7a includes broadcasting module 70a, receiving module 70b, generating module 70c, sending module 70d, and authentication module 70e.

The modules can be implemented as software components executing on one or more processors, as hardware such as programmable logic devices, and/or Application Specific Integrated Circuits designed to elements that can be embodied by of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

In some embodiments, broadcasting module 70a broadcasts device identification information of a to-be-authenticated Bluetooth device so that a destination Bluetooth gateway can forward the device identification information to a server in a Bluetooth mesh network. The destination Bluetooth gateway is the Bluetooth gateway that detected the to-be-authenticated Bluetooth device in the Bluetooth mesh network.

In some embodiments, receiving module 70b receives first authentication information and a server random number (forwarded by the destination Bluetooth gateway). In various embodiments, the first authentication information is generated by the server from the to-be-authenticated Bluetooth device authentication parameters maintained at its end and the server random number.

In some embodiments, authentication module 70e subjects the server to authentication based on the first authentication information and the server random number.

In some embodiments, generating module 70c uses the authentication parameters built into the to-be-authenticated Bluetooth device and a device random number to generate second authentication information.

In some embodiments, generating module 70c uses a hashing/encryption function to hash/encrypt the authentication parameters built into the to-be-authenticated Bluetooth device so as to generate a second authentication value and generate second authentication information based on the second authentication value and a device random number. Authentication parameters may be three-tuple information: (product ID, MAC address, secret key). Taking the three-tuple information (product ID, MAC address, secret key) as an example, when generating a second authentication value, generating module 70c may use a hashing/encryption function, e.g., SHA256 or MD5, to hash/encrypt the three-tuple information (product ID, MAC address, secret key), e.g., SHA256 applied to (product ID+MAC address+secret key) and then take the top 128 bits of the hashing/encryption results to be the second authentication value. The "+" in the above formula represents the combining of more than one piece of information, but it does not limit the specific forms of combination. For example, the "+" may represent "joined to," "and," "or," or another form of combination. In some embodiments, when generating second authentication information, generating module 70c uses AES-CMAC applied to (Random2||AuthValue2) to calculate the second authentication information. In this formula, "Random2" is the device random number, and "AuthValue2" is the second authentication value.

In some embodiments, sending module 70d forwards the second authentication information and the device random number via the destination Bluetooth gateway to the server so that the server can subject the to-be-authenticated Bluetooth device to authentication.

Figure 7B:
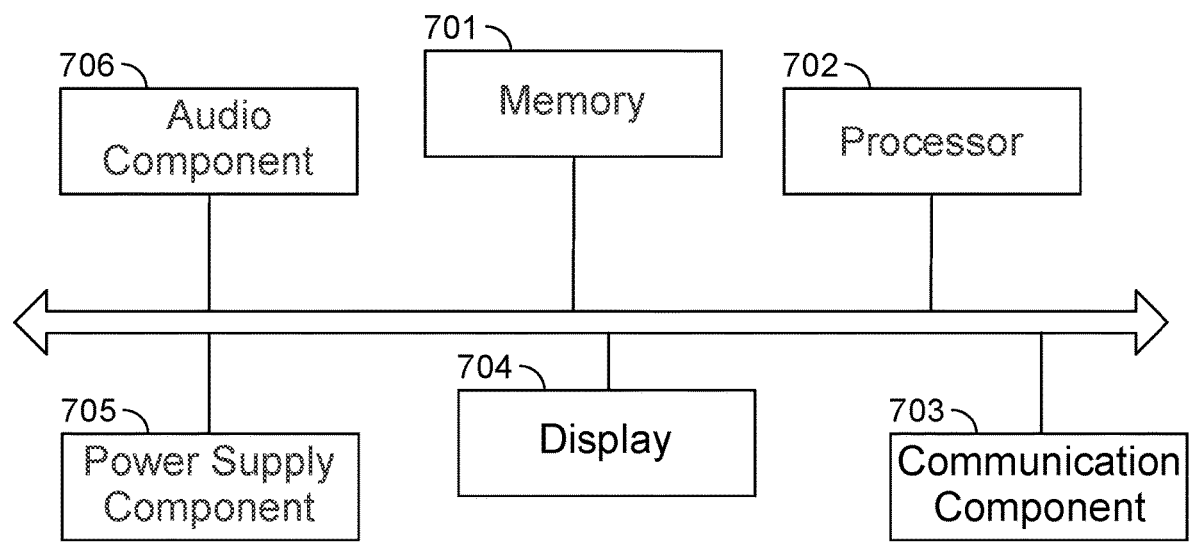
FIG. 7b is a diagram illustrating an embodiment of a to-be-authenticated Bluetooth device.

FIG. 7b is a diagram illustrating an embodiment of a to-be-authenticated Bluetooth device. In some embodiments, the to-be-authenticated Bluetooth device illustrated in FIG. 7b is one of the Bluetooth devices in Bluetooth mesh network 10 of FIG. 1 (e.g., Bluetooth lamp, Bluetooth television set, Bluetooth switch, Bluetooth socket, Bluetooth alarm, etc.). In the example shown, the to-be-authenticated Bluetooth device includes memory 701, processor 702, and communication component 703.

In various embodiments, communication component 703 broadcasts device identification information of the to-be-authenticated Bluetooth device so that a destination Bluetooth gateway can forward device identification information to a server in a Bluetooth mesh network. In various embodiments, communication component 703 receives first authentication information and a server random number (forwarded by the destination Bluetooth gateway). In various embodiments, the first authentication information is generated by the server on the basis of authentication parameters of the to-be-authenticated Bluetooth device (maintained by the server) and the server random number. The destination Bluetooth gateway is the Bluetooth gateway that detected the to-be-authenticated Bluetooth device in the Bluetooth mesh network.

In various embodiments, memory 701 stores computer programs and is configured to store other kinds of data to support operations on the to-be-authenticated Bluetooth device. Examples of this data include instructions of any application program or method used in Bluetooth device operations, e.g., the authentication parameters of the to-be-authenticated Bluetooth device, contact data, telephone directory data, messages, pictures, and video.

In various embodiments, processor 702, coupled to memory 701, executes computer programs in memory 701, e.g., for subjecting the server to authentication based on first authentication information and a server random number, generating second authentication information based on authentication parameters built into the to-be-authenticated Bluetooth device and a device random number, and forwarding the second authentication information and the device random number via the destination Bluetooth gateway to the server so that the server can subject the to-be-authenticated Bluetooth device to authentication.

In some embodiments, processor 702 uses a hashing/encryption function to hash/encrypt the authentication parameters built into the to-be-authenticated Bluetooth device so as to generate a second authentication value and generate second authentication information based on the second authentication value and a device random number. Authentication parameters may be three-tuple information: (product ID, MAC address, secret key). Taking the three-tuple information (product ID, MAC address, secret key) as an example, when generating a second authentication value, processor 702 may use a hashing/encryption function, e.g., SHA256 or MD5, to hash/encrypt the three-tuple information (product ID, MAC address, secret key), e.g., SHA256 applied to (product ID+MAC address+secret key) and then take the top 128 bits of the hashing/encryption results to be the second authentication value. The "+" in the above formula represents the combining of more than one piece of information, but it does not limit the specific forms of combination. For example, the "+" may represent "joined to," "and," "or," or another form of combination. In some embodiments, when generating second authentication information, processor 702 uses AES-CMAC applied to (Random2∥AuthValue2) to calculate the second authentication information. In this formula, "Random2" is the device random number, and "AuthValue2" is the second authentication value.

The to-be-authenticated Bluetooth device of FIG. 7b also includes display 704, power supply component 705, audio component 706, and other components that are not shown. FIG. 7b schematically presents only some of the components; other components that are not shown may also be present.

In some embodiments, a computer-readable medium storing computer programs is used. When executed, the computer programs are capable of implementing all the steps executable by the to-be-authenticated Bluetooth device as described above.

The memory in FIGS. 6b and 7b may be any type of volatile or non-volatile storage device or combination thereof, such as static random-access memory (SRAM), electrically erasable programmable read-only memory (EEPROM), erasable programmable read-only memory (EPROM), programmable read-only memory (PROM), read-only memory (ROM), magnetic storage, flash memory, magnetic disks, or optical disks.

The communication component in FIGS. 6b and 7b described above is configured to facilitate wired or wireless communication between the device where the communication component is located and other devices. The device where the communication component is located may access wireless networks based on a communications standard such as WiFi, 2G, 3G, 4G, 5G, or a combination thereof. In some embodiments, the communication component receives via broadcast channels broadcast signals or broadcast-related information from external broadcast management systems. In some embodiments, the communication component includes a near-field communication (NFC) module for promoting short-range communication. For example, short-range communication can be achieved in the NFC module on the basis of radio-frequency identification (RFID) technology, Infrared Data Association (IrDA) technology, ultra-wide band (UWB) technology, Bluetooth (BT) technology, and other technology.

The display in FIG. 7b described above may include a screen, which may include a liquid crystal display (LCD) and a touch panel (TP). If the screen includes a touch panel, the screen may be implemented as a touchscreen to receive input signals from a user. The touch panel may include one or more touch sensors to detect touch, sliding actions, and gestures on the touch panel. The touch sensor would not only detect the boundaries of touch or slide actions, but also measures duration and pressure related to the touch or slide operations.

The power supply component in FIGS. 6b and 7b described above provides electric power to the various components of the device where the power supply component is located. The power supply component may include a power supply management system, one or more power supplies, and other components related to generating, managing, and distributing power to the device where the power supply component is located.

The audio component in FIG. 7b described above may be configured to output and/or input audio signals. For example, the audio component may include a microphone (MIC). When the device where the audio component is located is in an operating mode, e.g., when in calling mode, recording mode, or speech recognition mode, the microphone is configured to receive external audio signals. The received audio signals may be stored in memory or transmitted by the communication component. In some embodiments, the audio component includes a speaker for outputting audio signals.

Figure 8:
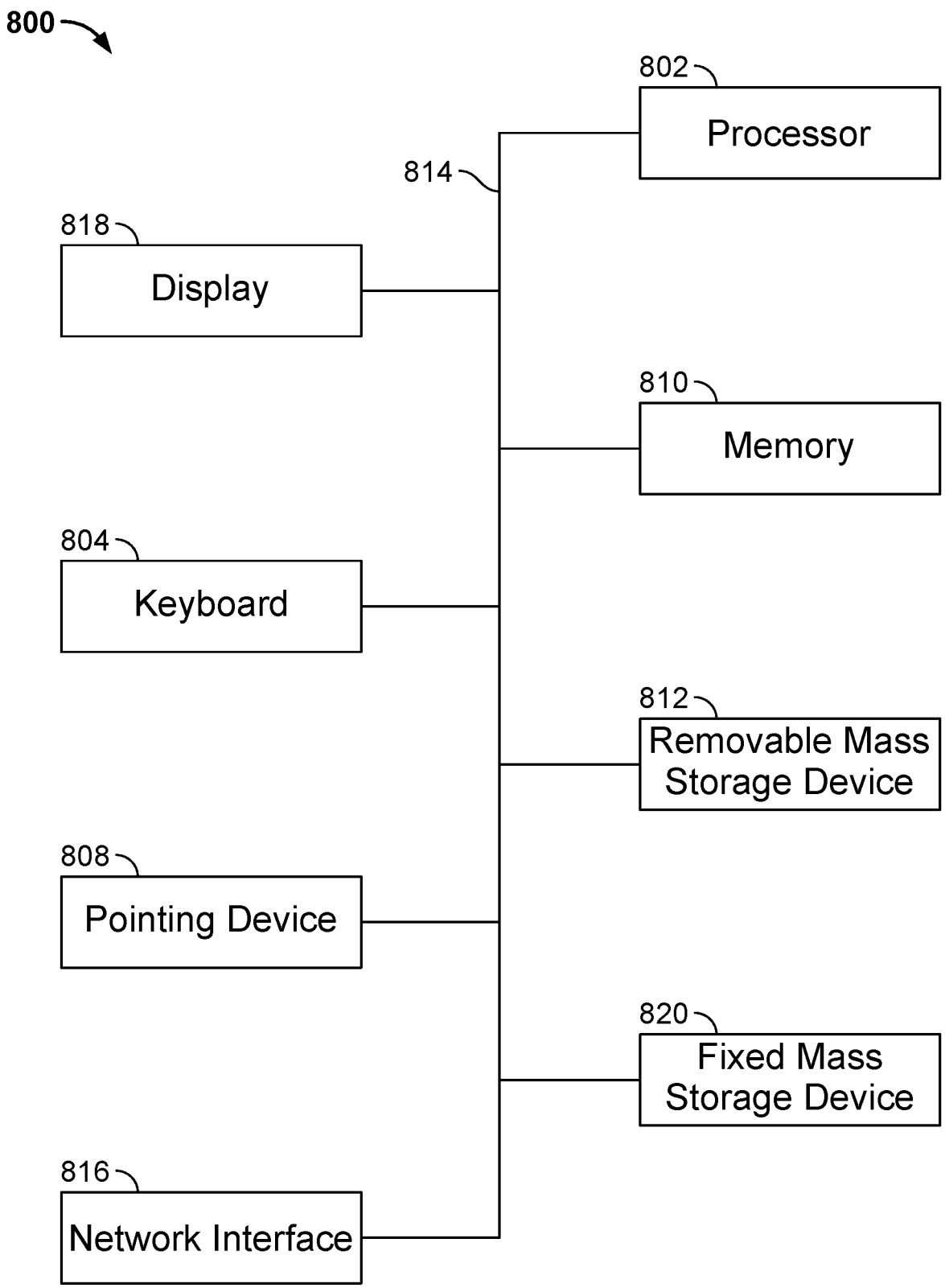
FIG. 8 is a functional diagram illustrating an embodiment of a programmed computer system.

FIG. 8 is a functional diagram illustrating an embodiment of a programmed computer system. In some embodiments, the programmed computer system of FIG. 8 implements one or more Bluetooth gateways 10a, server 10b, and/or one or more Bluetooth devices in Bluetooth mesh network 10 of FIG. 1. In some embodiments, the programmed computer system of FIG. 8 implements the process of FIG. 2, the process of FIG. 3, and/or the process of FIG. 4. In some embodiments, the programmed computer system of FIG. 8 implements the provisioning authentication sequence of FIG. 5. In some embodiments, the programmed computer system of FIG. 8 implements the provisioning modules of FIG. 6a and/or FIG. 7a.

As will be apparent, other computer system architectures and configurations can also be used. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general-purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage area, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800 and is coupled either bi-directionally (read/write) or uni-directionally (read only) to processor 802. For example, storage 812 can also include computer readable media such as magnetic tape, flash memory, PC-CARDS, portable mass storage devices, holographic storage devices, and other storage devices. A fixed mass storage 820 can also, for example, provide additional data storage capacity. The most common example of fixed mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display 818, a network interface 816, a keyboard 804, and a pointing device 808, as well as an auxiliary input/output device interface, a sound card, speakers, and other subsystems as needed. For example, the pointing device 808 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

A person skilled in the art should understand that the embodiments of the present invention can be provided as methods, systems or computer software products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) containing computer-operable program code.

The present invention is described with reference to flow charts and/or block diagrams based on methods, equipment (systems) and computer program products of the present invention. Each process flow and/or block within the flowcharts and/or block diagrams and combinations of process flows and/or blocks within the flowcharts and/or block diagrams can be implemented by computer instructions. These computer program instructions can be provided to general-purpose computers, special-purpose computers, embedded processors, or processors of other programmable data-processing devices to give rise to a machine such that the instructions executed by the computers or by the processors of other programmable data-processing devices give rise to devices used to implement the functions specified in one or more processes in a flow chart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

In some embodiments, computing equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information may be computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. In accordance with the definitions in this document, computer-readable media does not include transitory computer-readable media (transitory media) such as modulated data signals and carrier waves.

Please also note that the term "comprise" or "contain" or any of their variants are to be taken in their non-exclusive sense. Thus, processes, methods, merchandise, or devices that comprise a series of elements not only comprise those elements, but also other elements that have not been explicitly listed or elements that are intrinsic to such processes, methods, merchandise, or devices. In the absence of further limitations, elements that are limited by the phrase "comprises a(n) . . . " do not exclude the existence of additional identical elements in processes, methods, merchandise, or devices that comprise said elements.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor of an authenticating device;
    a storage of the authenticating device; and
    a memory coupled with the processor of the authenticating device, wherein the memory is configured to provide the processor with instructions which when executed cause the processor to:
        retrieve from the storage, device identification information associated with a to-be-authenticated Bluetooth device in a Bluetooth mesh network, wherein the device identification information has existed in the storage prior to communicative contact for authentication between the authenticating device and the to-be-authenticated Bluetooth device in the Bluetooth mesh network;
        determine a first set of device authentication parameters for the to-be-authenticated Bluetooth device in the Bluetooth mesh network based at least in part on the retrieved device identification information associated with the to-be-authenticated Bluetooth device;
        generate first authentication information based at least in part on the first set of device authentication parameters and a first random number;
        forward, via a gateway node that is part of the Bluetooth mesh network, using a first communication protocol, the first authentication information and the first random number to the to-be-authenticated Bluetooth device so that the to-be-authenticated Bluetooth device can perform an authentication operation;
        receive, via the gateway node, second authentication information and a second random number associated with the to-be-authenticated Bluetooth device, wherein:
            the second authentication information is generated based at least in part on a second set of device authentication parameters and the second random number;
            the second set of device authentication parameters matches the first set of device authentication parameters; and
            the second authentication information and the second random number are communicated from the to-be-authenticated Bluetooth device to the gateway node using a second communication protocol that is different from the first communication protocol; and
        authenticate the to-be-authenticated Bluetooth device based at least in part on the second authentication information and the second random number.

2. The system of claim 1, wherein the device identification information includes a product identifier associated with the to-be-authenticated Bluetooth device, a media access control address associated with the to-be-authenticated Bluetooth device, or both.

3. The system of claim 1, wherein the first set of device authentication parameters includes one or more of: a product identifier associated with the to-be-authenticated Bluetooth device, a media access control address associated with the to-be-authenticated Bluetooth device, and/or an authentication key associated with the to-be-authenticated Bluetooth device.

4. The system of claim 1, wherein to authenticate the to-be-authenticated Bluetooth device includes to:
    hash the first set of device authentication parameters to generate an authentication value;
    combine the authentication value with the second random number into a combined result;
    apply an encryption operation to the combined result to produce comparison authentication information; and
    determine whether the comparison authentication information matches the second authentication information.

5. The system of claim 1, wherein:
    the first set of device authentication parameters is maintained by a server node in the Bluetooth mesh network;
    the first authentication information and the first random number are generated by the server node or a device communicatively connected to the server node;
    the second set of device authentication parameters are built into the to-be-authenticated Bluetooth device; and
    the second authentication information and the second random number are generated by the to-be-authenticated Bluetooth device or a device communicatively connected to the to-be-authenticated Bluetooth device.

6. The system of claim 1, wherein the first random number is forwarded to the to-be-authenticated Bluetooth device via the gateway node after the gateway node receives the second authentication information from the to-be-authenticated Bluetooth device.

7. The system of claim 1, wherein:
    the first set of device authentication parameters is loaded onto a server in the Bluetooth mesh network before mutual authentication of the server and the to-be-authenticated Bluetooth device is performed; and the second set of device authentication parameters is loaded onto the to-be-authenticated Bluetooth device before the mutual authentication of the server and the to-be-authenticated Bluetooth device is performed.

8. The system of claim 1, wherein one or more of: the first authentication information, the first random number, the second authentication information, and the second random number are transmitted using a communication channel out of band of a communication channel used to transmit messages between nodes in the Bluetooth mesh network during operation of the Bluetooth mesh network unrelated to authentication.

9. The system of claim 1, wherein to generate the first authentication information includes to:
hash the first set of device authentication parameters to generate a first authentication value;
combine the first authentication value with the first random number into a first combined result; and
encrypt the first combined result.

10. The system of claim 9, wherein to generate the second authentication information includes to:
hash the second set of device authentication parameters to generate a second authentication value using a same hashing function that is used to hash the first set of device authentication parameters into the first authentication value;
combine the second authentication value with the second random number into a second combined result; and
encrypt the second combined result using a same encryption function that is used to encrypt the first combined result.

11. The system of claim 1, wherein the system includes a server node that is communicatively connected to one or more gateway nodes in the Bluetooth mesh network.

12. The system of claim 11, wherein the server node is a cloud server, cloud host, or virtual data center server.

13. The system of claim 1, wherein the memory is further configured to provide the processor with instructions which when executed cause the processor to forward to the to-be-authenticated Bluetooth device via the gateway node in the Bluetooth mesh network a key that defines membership in the Bluetooth mesh network and possession of which grants access to the Bluetooth mesh network.

14. The system of claim 13, wherein the gateway node is selected from a plurality of gateway nodes based at least in part on signal strengths of the to-be-authenticated Bluetooth device detected by the plurality of gateway nodes and/or priority levels of the plurality of gateway nodes.

15. A method, comprising:
retrieving from a storage of an authenticating device, device identification information associated with a to-be-authenticated Bluetooth device in a Bluetooth mesh network, wherein the device identification information has existed in the storage prior to communicative contact for authentication between the authenticating device and the to-be-authenticated Bluetooth device in the Bluetooth mesh network;
determining a first set of device authentication parameters for the to-be-authenticated Bluetooth device in the Bluetooth mesh network based at least in part on the retrieved device identification information associated with the to-be-authenticated Bluetooth device;
generating first authentication information based at least in part on the first set of device authentication parameters and a first random number;
forwarding, via a gateway node that is part of the Bluetooth mesh network, using a first communication protocol, the first authentication information and the first random number to the to-be-authenticated Bluetooth device so that the to-be-authenticated Bluetooth device can perform an authentication operation;
receiving, via the gateway node, second authentication information and a second random number associated with the to-be-authenticated Bluetooth device, wherein:
the second authentication information is generated based at least in part on a second set of device authentication parameters and the second random number;
the second set of device authentication parameters matches the first set of device authentication parameters; and
the second authentication information and the second random number are communicated from the to-be-authenticated Bluetooth device to the gateway node using a second communication protocol that is different from the first communication protocol; and
authenticating the to-be-authenticated Bluetooth device based at least in part on the second authentication information and the second random number.

16. A computer program product, the computer program product being embodied in a non-transitory computer readable storage medium and comprising computer instructions for:
retrieving from a storage of an authenticating device, device identification information associated with a to-be-authenticated Bluetooth device in a Bluetooth mesh network, wherein the device identification information has existed in the storage prior to communicative contact for authentication between the authenticating device and the to-be-authenticated Bluetooth device in the Bluetooth mesh network;
determining a first set of device authentication parameters for the to-be-authenticated Bluetooth device in the Bluetooth mesh network based at least in part on the retrieved device identification information associated with the to-be-authenticated Bluetooth device;
generating first authentication information based at least in part on the first set of device authentication parameters and a first random number;
forwarding, via a gateway node that is part of the Bluetooth mesh network, using a first communication protocol, the first authentication information and the first random number to the to-be-authenticated Bluetooth device so that the to-be-authenticated Bluetooth device can perform an authentication operation;
receiving, via the gateway node, second authentication information and a second random number associated with the to-be-authenticated Bluetooth device, wherein:
the second authentication information is generated based at least in part on a second set of device authentication parameters and the second random number;
the second set of device authentication parameters matches the first set of device authentication parameters; and
the second authentication information and the second random number are communicated from the to-be-authenticated Bluetooth device to the gateway node using a second communication protocol that is different from the first communication protocol; and authenticating the to-be-authenticated Bluetooth device based at least in part on the second authentication information and the second random number.

17. A system, comprising:
a processor of a gateway node in a Bluetooth mesh network; and
a memory coupled with the processor, wherein the memory is configured to provide the processor with instructions which when executed cause the processor to:
  detect device identification information associated with a to-be-authenticated Bluetooth device requesting access to the Bluetooth mesh network;
  report, using a first communication protocol, the device identification information to a server node in the Bluetooth mesh network;
  receive, through the first communication protocol, first authentication information and a first random number sent by the server node, wherein the first authentication information has been generated by the server node based at least in part on a copy of the device identification information retrieved from a storage of the server node, wherein the device identification information has existed in the storage of the server node prior to communicative contact for authentication between the server node and the to-be-authenticated Bluetooth device;
  forward, using a second communication protocol that is different from the first communication protocol, the first authentication information and the first random number to the to-be-authenticated Bluetooth device so that the to-be-authenticated Bluetooth device can authenticate the server node;
  receive, through the second communication protocol, second authentication information and a second random number sent by the to-be-authenticated Bluetooth device; and
  forward, using the first communication protocol, the second authentication information and the second random number to the server node so that the server node can authenticate the to-be-authenticated Bluetooth device.

18. A system, comprising:
a processor of a to-be-authenticated Bluetooth device in a Bluetooth mesh network; and
a memory coupled with the processor, wherein the memory is configured to provide the processor with instructions which when executed cause the processor to:
  broadcast device identification information so that a gateway node in the Bluetooth mesh network can forward, using a first communication protocol, the device identification information to a server node in the Bluetooth mesh network;
  receive, via the gateway node through a second communication protocol that is different from the first communication protocol, first authentication information and a first random number, wherein the first authentication information has been generated by the server node based at least in part on a copy of the device identification information retrieved from a storage of the server node, wherein the device identification information has existed in the storage of the server node prior to communicative contact for authentication between the server node and the to-be-authenticated Bluetooth device;
  authenticate the server node based at least in part on the first authentication information and the first random number;
  generate second authentication information based at least in part on built-in device authentication parameters and a second random number; and
  forward, using the second communication protocol and via the gateway node, the second authentication information and the second random number to the server node so that the server node can authenticate the to-be-authenticated Bluetooth device.

* * * * *